(12) United States Patent
Tanouchi et al.

(10) Patent No.: US 11,323,060 B2
(45) Date of Patent: May 3, 2022

(54) MOTOR CONTROL APPARATUS INCLUDING PROTECTION MECHANISM

(71) Applicant: Fanuc Corporation, Yamanashi (JP)

(72) Inventors: Hironao Tanouchi, Yamanashi (JP); Naoki Masuda, Yamanashi (JP); Masato Watanabe, Yamanashi (JP); Hirokazu Nagai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/110,474

(22) Filed: Dec. 3, 2020

(65) Prior Publication Data

US 2021/0184620 A1 Jun. 17, 2021

(30) Foreign Application Priority Data

Dec. 16, 2019 (JP) .............................. JP2019-226776

(51) Int. Cl.
| | |
|---|---|
| *H02P 29/024* | (2016.01) |
| *H02M 7/5387* | (2007.01) |
| *H02M 1/32* | (2007.01) |
| *H02P 29/68* | (2016.01) |
| *H02P 27/08* | (2006.01) |
| *H02M 1/00* | (2006.01) |

(52) U.S. Cl.
CPC .......... *H02P 29/0241* (2016.02); *H02M 1/32* (2013.01); *H02M 7/53871* (2013.01); *H02P 27/08* (2013.01); *H02P 29/68* (2016.02); *H02M 1/0009* (2021.05)

(58) Field of Classification Search
CPC combination set(s) only.
See application file for complete search history.

(56) References Cited

U.S. PATENT DOCUMENTS 9,036,382 B2 * 5/2015 Li .......................... H02M 1/32
363/50

FOREIGN PATENT DOCUMENTS

| JP | 01185186 A | 7/1989 |
| JP | 09103088 A | 4/1997 |
| JP | 2004103031 A | 4/2004 |

* cited by examiner

*Primary Examiner* — Antony M Paul
(74) *Attorney, Agent, or Firm* — RatnerPrestia

(57) ABSTRACT

A motor control apparatus includes: a converter configured to convert alternating current power of an AC source into direct current power; an inverter configured to convert the direct current power in a DC link into alternating current power for motor driving by the switching device being subjected to ON/OFF control, a DC link voltage detection unit configured to detect a DC link voltage, a DC link voltage determination unit configured to determine whether the DC link voltage exceeds a voltage threshold value, an alarm signal output unit configured to output an alarm signal in an abnormal condition; and a switching control unit configured to perform ON/OFF control on the switching device, and, when the alarm signal is output and the DC link voltage exceeds the voltage threshold value, the switching control unit performs control in such a way as to turn on all the switching device of a lower arm.

11 Claims, 12 Drawing Sheets

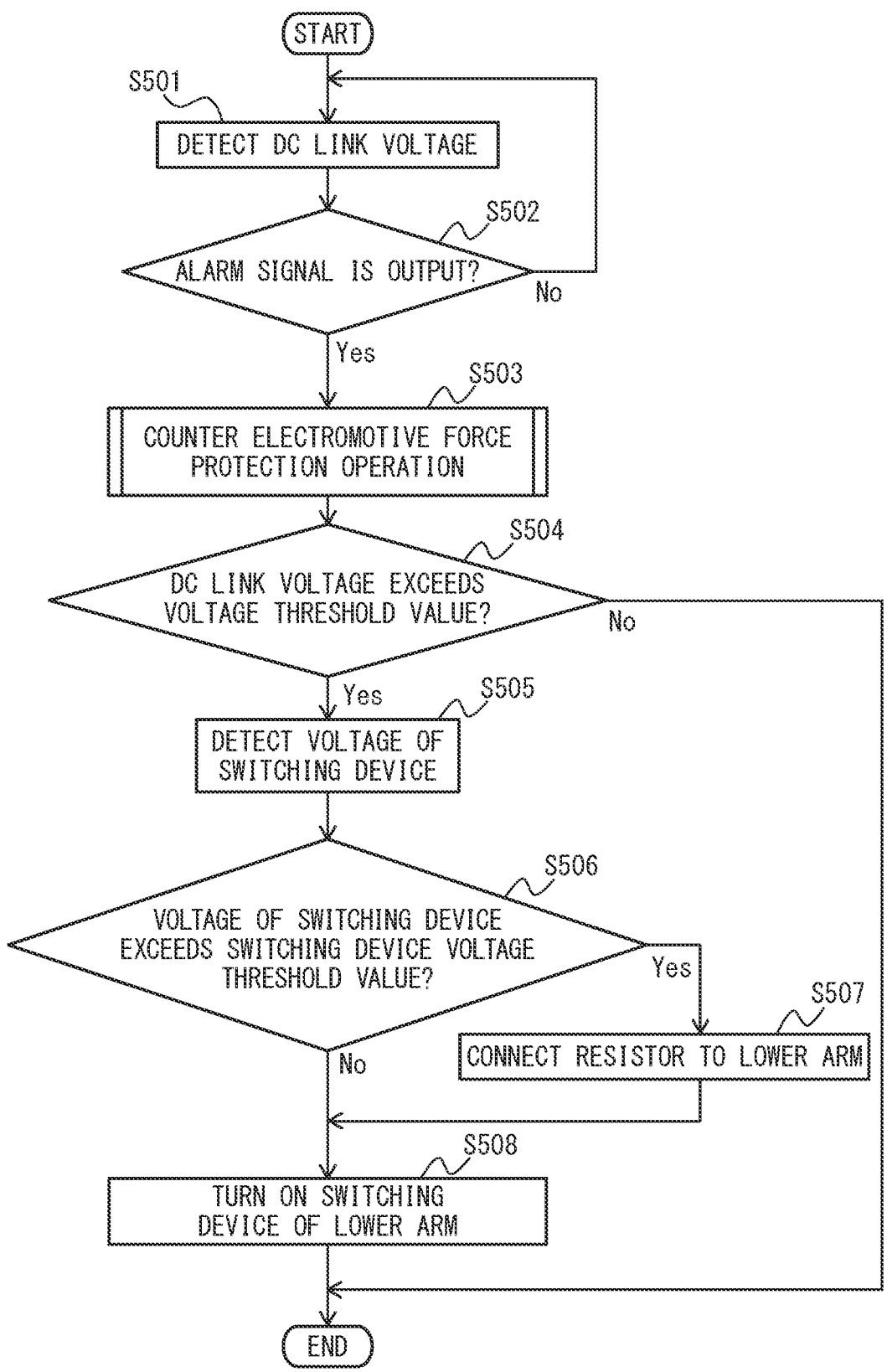

MOTOR CONTROL APPARATUS INCLUDING PROTECTION MECHANISM

CROSS-REFERENCE TO RELATED APPLICATIONS

This application is a new U.S. Patent Application that claims benefit of Japanese Patent Application No. 2019-226776, filed Dec. 16, 2019, the disclosure of which is incorporated herein by reference in its entirety for all purposes.

BACKGROUND OF THE INVENTION

1. Field of Invention

The present invention relates to a motor control apparatus including a protection mechanism.

2. Description of the Related Art

In a motor control apparatus that controls driving of a motor in a machine tool, forging machinery, an injection molding machine, industrial machinery, or various robots, alternating current power supplied from an alternating current power supply is converted into direct current power in a converter and output to a DC link, the direct current power in the DC link is further converted into alternating current power in an inverter, and the alternating current power is supplied as motor driving power to the motor. The "DC link" refers to a circuit portion that electrically connects a direct current output side of the converter and a direct current input side of the inverter, and may also be differently referred to as a "DC link portion", a "direct current link", a "direct current link portion", a "direct current generating line", a "direct current intermediate circuit", or the like. The DC link is provided with a DC link capacitor.

When an abnormality occurs in the motor control apparatus, a machine provided with the motor control apparatus, the alternating current power supply that supplies power to the motor control apparatus, or the like, an alarm signal is output in the motor control apparatus or an upper control apparatus of the motor control apparatus. When the alarm signal is output, the motor control apparatus urgently stops the motor, and at this time, energy on the basis of counter electromotive force is generated in the motor. The energy generated in the motor is regenerated into the alternating current power supply or regenerated into a regeneration load (regeneration resistor) provided in the DC link. However, when the motor is large or the motor rotates at a high speed, the energy on the basis of the counter electromotive force generated when the motor is urgently stopped is extremely large, and the energy cannot be regenerated into the alternating current power supply or the regeneration load. Thus, some kind of measures is necessary.

For example, as described in Japanese Unexamined Patent Publication No. H01-185186, a servo system protection device for an abnormal current has been known that includes: current command means (102, 104) for commanding a current according to a position command and rotational angle position information transmitted from a rotational angle position detector including servo-motor; current control means (106) for receiving the current command and generating a PWM signal; energization control means (110, 112, 114, 116, 118, 120) for receiving the PWM signal and controlling a driving current passing through the servo-motor; current detection means (124, 126) for detecting the driving current; and phase monitoring means (28) for receiving the detected driving current information and the rotational angle position information of the servo-motor, determining whether a phase of the driving current corresponds to the rotational angle position, and also interrupting, when the phase does not correspond to the rotational angle position, the PWM signal, and the current control means receives the other driving current information of the current command and sends the PWM signal.

For example, as described in Japanese Unexamined Patent Publication No. H09-103088, a motor driving circuit that supplies driving power to a motor has been known that is formed of a differential amplifier including a first input to which a reference voltage is applied, and a resistor that is connected between the differential amplifier and the motor and has the motor side connected to a second input of the differential amplifier, and is provided with an overcurrent detection circuit that detects a voltage drop value due to the resistor in the motor driving circuit operating in such a way as to supply power at a predetermined voltage to the motor, and outputs a signal indicating that an overcurrent flows through the motor when the voltage drop value exceeds a predetermined voltage value.

For example, as described in Japanese Unexamined Patent Publication No. 2004-103031, an abnormality detection/diagnosis method of a servo control system has been known that detects a transmission-side connection state of a plurality of detector reception circuits when a power supply is turned on, thus automatically determines a detector type name being actually connected, and issues a parameter abnormal alarm when a detector type designated by a parameter is different from that of the detector being actually connected.

SUMMARY OF INVENTION

In a case where energy on the basis of counter electromotive force generated when a motor is urgently stopped is large at the time of outputting an alarm signal, the energy cannot be regenerated into an alternating current power supply and a regeneration load, and a DC link voltage significantly increases. Thus, a counter electromotive force protection circuit that consumes the energy on the basis of the counter electromotive force at the time of outputting an alarm may be provided. However, even with the counter electromotive force protection circuit being provided, the energy on the basis of the counter electromotive force cannot be consumed when the counter electromotive force protection circuit is faulty, and the DC link voltage significantly increases. When the DC link voltage exceeds a withstanding voltage of a DC link capacitor, the DC link capacitor breaks (explodes), which is extremely dangerous. Therefore, in a motor control apparatus in which a converter and an inverter are connected to each other via a DC link, a technique capable of reliably preventing a significant increase in a DC link voltage due to an abnormal occurrence is desired.

According to one aspect of the present disclosure, a motor control apparatus includes: a converter configured to convert alternating current power input from an alternating current input side into direct current power, and output the direct current power to a DC link on a direct current output side; an inverter that is provided with, in each of an upper arm on a high potential side and a lower arm on a low potential side, a switching device connected in reverse parallel to a diode, and configured to convert the direct current power in the DC link into alternating current power for driving a motor by the switching device provided in the upper arm and the lower arm being subjected to ON/OFF control and output the alternating current power; a DC link voltage detection unit configured to detect a DC link voltage being a voltage between terminals of the DC link; a DC link voltage determination unit configured to determine whether the DC link voltage exceeds a voltage threshold value; an alarm signal output unit configured to output an alarm signal in an abnormal condition; and a switching control unit configured to perform ON/OFF control on the switching device, and, when the alarm signal is output from the alarm signal output unit and the DC link voltage determination unit determines that the DC link voltage exceeds the voltage threshold value, the switching control unit performs control in such a way as to turn on all the switching device of the lower arm.

BRIEF DESCRIPTION OF THE DRAWINGS

The present invention will be more clearly understood with reference to the following accompanying drawings:

FIG. 12 is a flowchart illustrating an operation flow of the motor control apparatus according to the fifth embodiment of the present disclosure.

DETAILED DESCRIPTION

Figure 1:
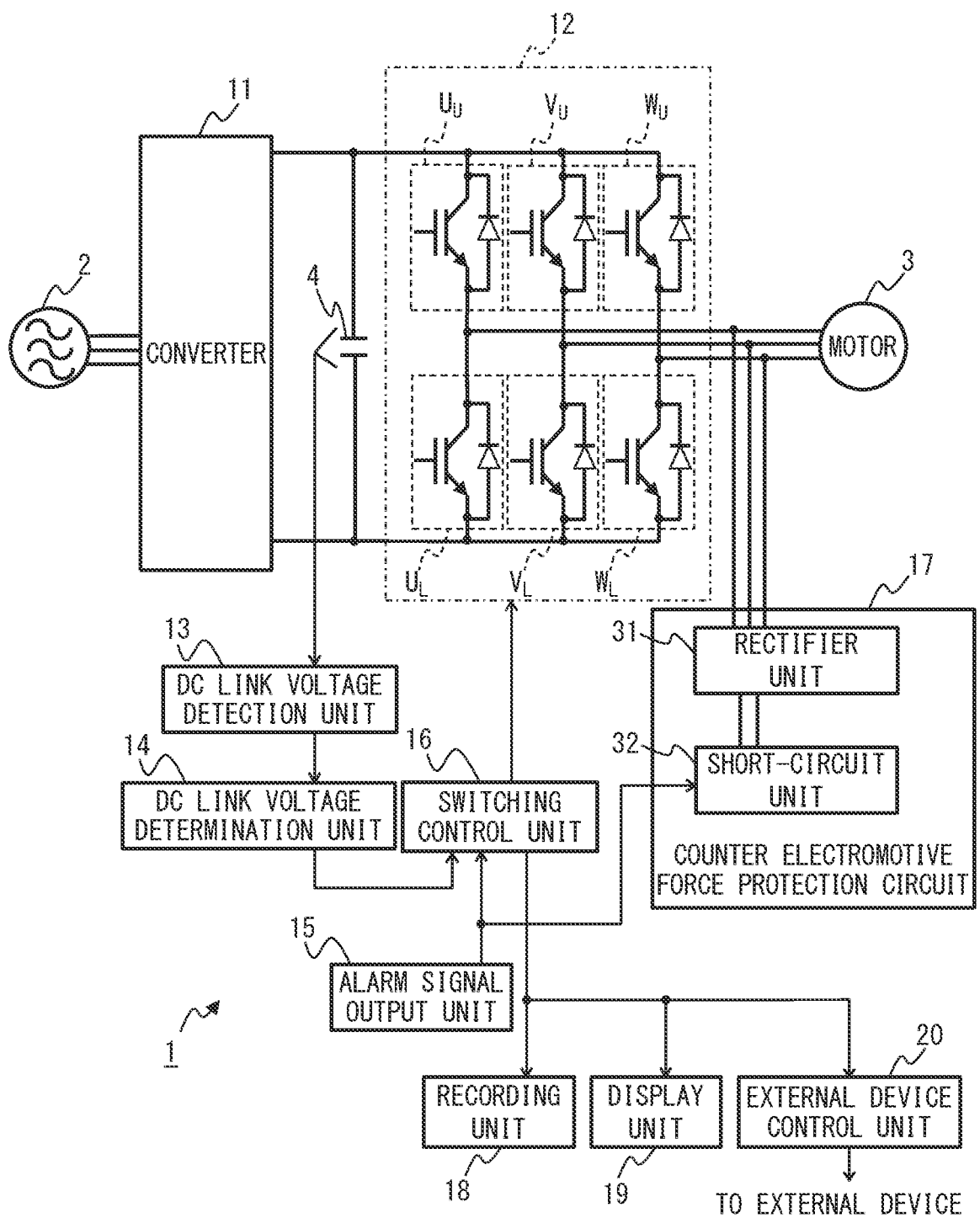
FIG. 1 is a diagram illustrating a motor control apparatus according to a first embodiment of the present disclosure.

A motor control apparatus including a protection mechanism will be described with reference to the following drawings. A scale is appropriately changed in the drawings in order to facilitate understanding. An aspect illustrated in the drawing is one example for implementation, and the present invention is not limited to the illustrated embodiment.

FIG. 1 is a diagram illustrating a motor control apparatus according to a first embodiment of the present disclosure.

As one example, a case where a motor control apparatus 1 connected to an alternating current power supply 2 controls a motor 3 will be described. In the first embodiment and from a second embodiment to a fifth embodiment described below, a type of the motor 3 is not particularly limited, and the motor 3 may be, for example, an induction motor or a synchronous motor. Further, the number of phases of the alternating current power supply 2 and the motor 3 does not particularly limit the first embodiment and the second to fifth embodiments described below, and may be, for example, three phases or a single phase. In the illustrated example, it is assumed that each of the alternating current power supply 2 and the motor 3 includes three phases. As one example of the alternating current power supply 2, there are a three-phase alternating current 400 V power supply, a three-phase alternating current 200 V power supply, a three-phase alternating current 600 V power supply, a single-phase alternating current 100 V power supply, and the like. A machine provided with the motor 3 includes, for example, a machine tool, a robot, forging machinery, an injection molding machine, industrial machinery, various electric appliances, a train, a car, an aircraft, and the like.

As illustrated in FIG. 1, the motor control apparatus 1 according to the first embodiment of the present disclosure includes a converter 11, an inverter 12, a DC link voltage detection unit 13, a DC link voltage determination unit 14, an alarm signal output unit 15, and a switching control unit 16. Further, the motor control apparatus 1 includes a DC link capacitor 4, a counter electromotive force protection circuit 17, a recording unit 18, a display unit 19, and an external device control unit 20.

The converter 11 is a rectifier that converts alternating current power input from an alternating current input side into direct current power, and outputs the direct current power to a DC link on a direct current output side. In the illustrated example, since it is assumed that the alternating current power supply 2 is a three-phase alternating current power supply, the converter 11 is formed of a three-phase full-bridge circuit, but the converter 11 functions as a single-phase bridge circuit when single-phase alternating current power is supplied from the alternating current power supply 2. As an example of the converter 11, there are a diode rectifier, a 120-degree energization system rectifier, a PWM switching control system rectifier, and the like. For example, when the converter 11 is a diode rectifier, the converter 11 is formed of a full-bridge circuit of a diode. For example, when the converter 11 is a 120-degree energization system rectifier and a PWM switching control system rectifier, the converter 11 is formed of a switching device and a full-bridge circuit of a diode connected in reverse parallel to the switching device, and performs power conversion in two AC-DC ways by each switching device being subjected to ON/OFF control in accordance with a driving command received from an upper control apparatus (not illustrated). As an example of the switching device when the converter 11 is a 120-degree energization system rectifier and a PWM switching control system rectifier, there are an IGBT, an FET, a thyristor, a gate turn-off thyristor (GTO), a transistor, and the like, but the switching device may be another semiconductor device. Note that an alternating current reactor, an AC line filter, an electromagnetic contactor, a breaker, and the like may be provided on the alternating current input side of the converter 11, which are not illustrated herein.

The DC link that connects the direct current output side of the converter 11 and a direct current input side of the inverter 12 is provided with the DC link capacitor 4. The DC link capacitor 4 has a function of accumulating direct current power used for generating alternating current power by the inverter 12, and a function of suppressing a pulsation of a direct current output or the converter 11. As an example or the DC link capacitor 4, there are, for example, an electrolytic capacitor, a film capacitor, and the like. Note that the DC link may be provided with a regeneration load (regeneration resistor) for consuming regeneration energy from the motor 3.

The inverter 12 is connected to the converter 11 via the DC link, converts the direct current power in the DC link into alternating current power for motor driving, and outputs the alternating current power. In the illustrated example, since it is assumed that the motor 3 is a three-phase alternating current motor, the inverter 12 is formed of a three-phase full-bridge circuit, but the inverter 12 is formed of a single-phase full-bridge circuit when the motor 3 is a single-phase motor.

In the inverter 12, the switching device connected in reverse parallel to the diode is provided in each of an upper arm on a high potential side and a lower arm on a low potential side. In the illustrated example, it is assumed for a U phase that the upper arm is $U_U$ and the lower arm is $U_L$, it is assumed for a V phase that the upper arm is $V_U$ and the lower arm is $V_L$, and it is assumed for a W phase that the upper arm is $W_U$ and the lower arm is $W_L$. The switching device provided in each of the upper arms $U_U$, $V_U$, and $W_U$ and the lower arms $D_L$, $V_L$, and $W_L$ is subjected to ON/OFF control according to, for example, a PWM control system on the basis of a command of the switching control unit 16, and thus the inverter 12 converts the direct current power in the DC link into alternating current power for motor driving and outputs the alternating current power. A speed, a torque, or a position of a rotor of the motor 3 is controlled on the basis of the alternating current power supplied from the inverter 12. Note that PWM control is appropriately performed on an ON/OFF operation of the switching device, and thus the inverter 12 can also regenerate power generated in the motor 3 into the alternating current power supply 2 or the DC link. When power is regenerated into the DC link, a regeneration load (regeneration resistor) is provided in the DC link, and energy regenerated from the motor 3 via the inverter 12 is consumed by the regeneration load. As an example of the switching device, there are an IGBT, an FET, a thyristor, a GTO, a transistor, and the like, but the switching device may be another semiconductor device.

The DC link voltage detection unit 13 detects a DC link voltage being a voltage between terminals of the DC link. In other words, the DC link voltage detection unit 13 detects, as the DC link voltage, a value of a potential difference between a positive potential that appears in a positive terminal on the direct current output side of the converter 11 and a negative potential that appears in a negative terminal on the direct current output side of the converter 11. Alternatively, the DC link voltage detection unit 13 may detect, as the DC link voltage, a voltage applied between positive and negative electrode terminals of the DC link capacitor 4. A value of the DC link voltage detected by the DC link voltage detection unit 13 is transmitted to the DC link voltage determination unit 14.

The DC link voltage determination unit 14 compares the DC link voltage detected by the DC link voltage detection unit 13 with a voltage threshold value $V_{th1}$, and determines whether the DC link voltage exceeds the voltage threshold value. Even when the motor control apparatus 1 normally drives the motor 3 without a fault in a state where there is no power failure in the alternating current power supply 2 (hereinafter, simply referred to as a "normal state"), a slight pulsation is occurred in the DC link voltage. The voltage threshold value $V_{th1}$ is set to a value higher than the DC link voltage increased due to the pulsation under the normal state occurring when the motor control apparatus 1 drives the motor 3. The voltage threshold value $V_{th1}$ can be appropriately set by operating the motor control apparatus 1 by, for example, experiment or an actual operation, or previously acquiring, by a simulation by a computer, a relationship between an application environment of the motor control apparatus 1 or a voltage value on the direct current output side of the converter 11 and presence or absence of an output of an alarm signal in the motor control apparatus 1, and the like. As one example, a target value of the DC link voltage in the normal state is generally set according to an application environment of the motor control apparatus 1, and thus the voltage threshold value $V_{th1}$ may be set to a value higher than the target value by, for example, about a few percent to a dozen percent. The numerical example indicated herein is merely one example, and another value may be set. Note that the voltage threshold value $V_{th1}$ may be stored in a rewritable storage unit (not illustrated) and be rewritable by external equipment, and can be changed to an appropriate value as necessary even after the voltage threshold value $V_{th1}$ is set once.

The alarm signal output unit 15 outputs an alarm signal in an abnormal condition. As the abnormal condition in which the alarm signal is output, there are, for example, a failure of the motor control apparatus 1, a failure of a machine provided with the motor control apparatus 1, an overload on the motor control apparatus 1, a power failure of the alternating current power supply 2 that supplies power to the motor control apparatus 1, and the like. For example, when an overcurrent, an overvoltage, a low voltage, or abnormal heat generation is detected by various detection units (not illustrated) in a circuit of the motor control apparatus 1, or when a power failure of the alternating current power supply 2 is detected by a power failure detection unit (not illustrated), the alarm signal output unit 15 outputs the alarm signal. The alarm signal output from the alarm signal output unit 15 is transmitted to the switching control unit 16. Furthermore, the alarm signal output unit 15 may have a function of transferring, to the switching control unit 16, an alarm signal output from equipment provided outside the motor control apparatus 1.

The switching control unit 16 performs ON/OFF control on the switching device provided in each of the upper arms $U_U$, $V_U$, and $W_U$ and the lower arms $U_L$, $V_L$, and $W_L$ in the inverter 12. As a control system of the switching device by the switching control unit 16, there is the PWM control system, for example. The switching control unit 16 performs ON/OFF control on the switching device on the basis of a rotation speed (speed feedback) of the motor 3, a current (current feedback) of the motor 3, a predetermined torque command, an operation program of the motor 3, and the like, and controls a power conversion operation of the inverter 12. A speed, a torque, or a position of a rotor of the motor 3 is controlled on the basis of, for example, variable-voltage and variable-frequency alternating current power supplied from the inverter 12. Note that the configuration of the switching control unit 16 described herein is merely one example, and the configuration of the switching control unit 16 may be defined by including terms such as a position command generation unit, a position control unit, a speed control unit, a current control an it, and a torque command generation unit, for example.

Further, in the first embodiment, when the alarm signal is output from the alarm signal output unit 15 and the DC link voltage determination unit 14 determines that the DC link voltage exceeds the voltage threshold value $V_{th1}$, the switching control unit 16 stops switching control by the PWM control system performed in a normal condition, and performs control in such a way as to turn on all of the switching devices of the lower arms $U_L$, $V_L$, and $W_L$ instead of the switching control. Note that, when all of the switching devices of the lower arms $U_L$, $V_L$, and $W_L$ are turned on, phases of motor windings are short-circuited regardless of ON/OFF of the switching devices of the upper arms $U_U$, $V_U$, and $W_U$. Thus, when the alarm signal is output from the alarm signal output unit 15 and the DC link voltage determination unit 14 determines that the DC link voltage exceeds the voltage threshold value $V_{th1}$, the switching devices of the upper arms $U_U$, $V_U$, and $W_U$ may be controlled in such a way as to turn ON or may be controlled in such a way as to turn OFF. When the alarm signal is output from the alarm signal output unit 15 and the motor 3 is urgently stopped, large energy on the basis of counter electromotive force is generated. (A part of or the whole) energy on the basis of the counter electromotive force is consumed by the motor windings having the phases in the short-circuit state and the switching devices in the ON state of the lower arms $U_L$, $V_L$, and $W_L$, and does not flow into the DC link capacitor 4. Thus, a significant increase in the DC link voltage can be prevented, and there is no risk of breakage of the DC link capacitor 4. Note that the large energy on the basis of the counter electromotive force flows through the switching devices of the lower arms $U_L$, $V_L$, and $W_L$ in the ON state, and thus there is a possibility that the switching devices may break. However, breakage of the switching devices has a smaller influence on surroundings than that of breakage (i.e., explosion) of the DC link capacitor 4, and, even when an operator is located near the motor control apparatus 1, no harm is caused to the human body.

The counter electromotive force protection circuit 17 is provided between an alternating current output side of the inverter 12 and the motor 3. The counter electromotive force protection circuit 17 includes a rectifier unit 31 and a short-circuit unit 32.

The rectifier unit 31 in the counter electromotive force protection circuit 17 is a rectifier that rectifies alternating current power on the basis of counter electromotive force of the motor 3 and outputs direct current power. In the illustrated example, since it is assumed that the motor 3 is a three-phase alternating current motor, the rectifier unit 31 is formed of a three-phase full-bridge circuit, but the rectifier unit 31 is formed of a single-phase full-bridge circuit when the motor 3 is a single-phase motor. As an example of the rectifier unit 31, there are a diode rectifier, a 120-degree energization system rectifier, a PWM switching control system rectifier, and the like.

The short-circuit unit 32 in the counter electromotive force protection circuit 17 includes a switch mechanism for short-circuiting or not short-circuiting terminals on a direct current output side of the rectifier unit 31 depending on, for example, whether the alarm signal is output from the alarm signal output unit 15. As an example of the switch mechanism, there is a semiconductor device such as an IGBT, an FET, a thyristor, a GTO, or a transistor, a mechanical switch such as a relay, or the like. A switching operation by the short-circuit unit 32 in the counter electromotive force protection circuit 17 may be controlled by the switching control unit 16, for example, or a control unit (not illustrated) different from the switching control unit 16 may be provided. When the alarm signal is output from the alarm signal output unit 15, the short-circuit unit 32 short-circuits the terminals on the direct current output side of the rectifier unit 31. Further, when the alarm signal is not output from the alarm signal output unit 15 (i.e., in a case of the normal state), the short-circuit unit 32 does not short-circuit the terminals on the direct current output side of the rectifier unit 31, that is, it is in a state where nothing is connected between the terminals on the direct current output side of the rectifier unit 31. Thus, the rectifier unit 31 performs the operation of rectifying alternating current power and outputting direct current power only when the alarm signal is output from the alarm signal output unit 15 and thus the terminals on the direct current output side of the rectifier unit 31 are short-circuited. When the alarm signal is output from the alarm signal output unit 15 and the motor 3 is urgently stopped, large energy (alternating current power) on the basis of counter electromotive force is generated, and thus the rectifier unit 31 rectifies the alternating current power on the basis of the "counter electromotive force of the motor 3" and outputs direct current power.

As long as the counter electromotive force protection circuit 17 normally operates, all the energy on the basis of the counter electromotive force generated when an alarm is output (i.e., when the motor 3 is urgently stopped) is consumed by the motor windings having the phases in the short-circuit state via the rectifier unit 31 and the short-circuit unit 32 in the counter electromotive force protection circuit 17 to stop the motor 3, and the DC link voltage does not significantly increase. However, the counter electromotive force protection circuit 17 breaks down, and even though the alarm signal is output from the alarm signal output unit 15, there is also a possibility that the terminals on the direct current output side of the rectifier unit 31 are not short-circuited. When the counter electromotive force protection circuit 17 breaks down, the DC link voltage gradually increases. In the first embodiment, when it is determined that the DC link voltage exceeds the voltage threshold value $V_{th1}$, the switching control unit 16 performs control in such a way as to turn on all of the switching devices of the lower arms $U_L$, $V_L$, and $W_L$, and thus the energy on the basis of the counter electromotive force is consumed by the motor windings having the phases in the short-circuit state and the switching devices of the lower arms $U_L$, $V_L$, and $W_L$. Thus, a significant increase in the DC link voltage can be prevented, and there is no risk of breakage of the DC link capacitor 4. Further, even when the energy on the basis of the counter electromotive force flows through the switching devices of the lower arms $U_L$, $V_L$, and $W_L$ in the ON state and the switching devices break, the influence on surroundings is smaller than that of breakage (i.e., explosion) of the DC link capacitor 4.

In this way, a case where DC link voltage exceeds the voltage threshold value when the alarm signal is output from the alarm signal output unit 15 is the time when the counter electromotive force protection circuit 17 breaks down. When the counter electromotive force protection circuit 17 breaks down, the switching control unit 16 performs an operation of performing control in such a way as to turn on all of the switching devices of the lower arms $U_L$, $V_L$, and $W_L$. Thus, the recording unit 18, the display unit 19, and the external device control unit 20 are provided in the motor control apparatus 1 in order to record and display all of the switching devices of the lower arms $U_L$, $V_L$, and $W_L$ being turned on by the switching control unit 16, and notify an operator of a fault of the counter electromotive force protection circuit 17.

The recording unit 18 records all of the switching devices of the lower arms $U_L$, $V_L$, and $W_L$ in the inverter 12 being turned on when the alarm signal is output from the alarm signal output unit 15 and the DC link voltage determination unit 14 determines that the DC link voltage exceeds the voltage threshold value $V_{th1}$. The recording unit 18 is, for example, a hard disk drive (HDD) attached to the motor control apparatus 1, a solid state drive (SSD), an EEPROM (registered trademark), a DRAM, an SRAM, or the like. On the basis of a content recorded in the recording unit 18, the content may be printed out on a paper or the like at a later date by using a printer, and may be displayed.

The displays unit 19 displays all of the switching devices of the lower arms $U_L$, $V_L$, and $W_L$ in the inverter 12 being turned on when the alarm signal is output from the alarm signal output unit 15 and the DC link voltage determination unit 14 determines that the DC link voltage exceeds the voltage threshold value $V_{th1}$. As an example of the display unit 19, there are a display attached to the motor control apparatus 1, a portable terminal, a touch panel, and the like.

The external device control unit 20 performs control in such a way as to cause an external device (not illustrated) to record or display all of the switching devices of the lower arms $U_L$, $V_L$, and $W_L$ in the inverter 12 being turned on when the alarm signal is output from the alarm signal output unit 15 and the DC link voltage determination unit 14 determines that the DC link voltage exceeds the voltage threshold value $V_{th1}$. As the external device, there are, for example, a hard disk drive (HDD) provided outside the motor control apparatus 1, a solid state drive (SSD), an EEPROM (registered trademark), a DRAM, an SRAM, an attached display, a portable terminal, a touch panel, and the like.

In this way, the recording unit 18, the display unit 19, and the external device control unit 20 record and display the operation of "performing control in such a way as to turn on all of the switching devices of the lower arms $U_L$, $V_L$, and $W_L$" being performed, and thus an operator can be notified that the counter electromotive force protection circuit 17 breaks down. For example, the display unit 19 performs display that "all switching devices of lower arms are turned on" or direct display that "counter electromotive force protection circuit breaks down". An operator can easily recognize that the counter electromotive force protection circuit 17 breaks down on the basis of a recording content by the recording unit 18, a display content by the display unit 19, or a display content or a recording content by the external device. Thus, an operator can immediately perform work such as repair and replacement of the counter electromotive force protection circuit 17, for example. Further, for example, an operator can analyze a content recorded in the recording unit 18 by using an arithmetic processing device, and realize a tendency of an abnormality occurring in the counter electromotive force protection circuit 17. The above-described display example by the display unit 19 is merely one example, and "counter electromotive force protection circuit breaks down" may be displayed on the basis of the other character expression and illustration. As an alternative example, instead of the display unit 19, acoustic equipment that emits sound such as a voice, a speaker, a buzzer, and a chime, for example, may be used for the achievement, and, in this case, the acoustic equipment preferably has no sound while the counter electromotive force protection circuit 17 normally operates. Alternatively, the display by the display unit 19 and acoustic expression by the acoustic equipment may be appropriately combined for the achievement.

Note that the motor control apparatus 1 does not necessarily need to include all of the recording unit 18, the display unit 19, and the external device control unit 20 at the same time, and may appropriately include the recording unit 18, the display unit 19, and the external device control unit 20 as necessary.

Figure 2:
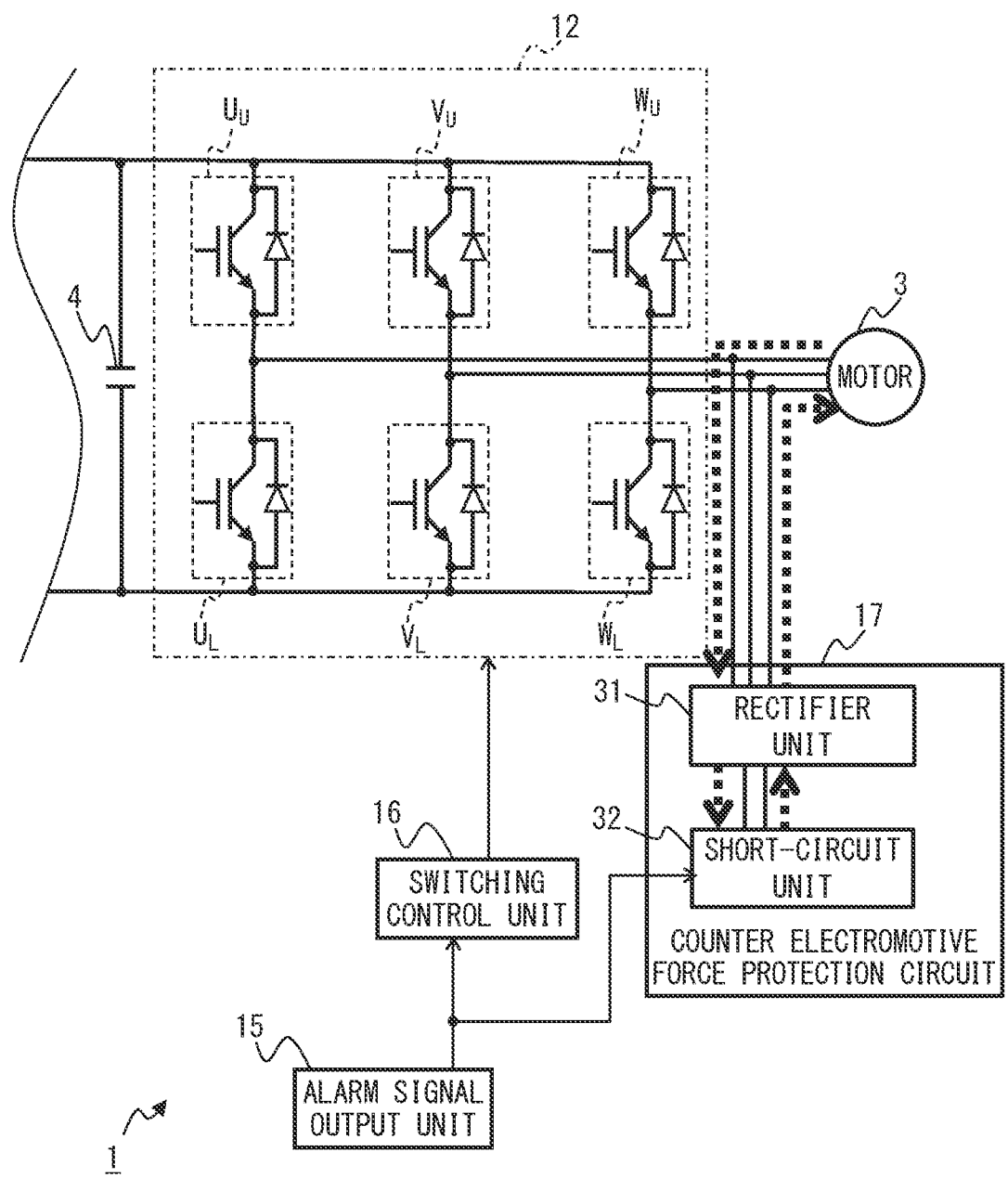
FIG. 2 is a diagram illustrating an operation of a counter electromotive force protection circuit in the motor control apparatus according to the first to fifth embodiments of the present disclosure.

FIG. 2 is a diagram illustrating an operation of the counter electromotive force protection circuit in the motor control apparatus according to the first to fifth embodiments of the present disclosure. FIG. 2 is applicable to not only the first embodiment but also the second to fifth embodiments described below. In FIG. 2, the alternating current power supply 2, the converter 11, the DC link voltage detection unit 13, the DC link voltage determination unit 14, the recording unit 18, the display unit 19, and the external device control unit 20 are omitted.

Whether the short-circuit unit 32 short-circuits the terminals on the direct current output side of the rectifier unit 31 is determined depending on whether the alarm signal is output from the alarm signal output unit 15. The short-circuit unit 32 short-circuits the terminals on the direct current output side of the rectifier unit 31 when the alarm signal is output from the alarm signal output unit 15. Which phase of a diode a current flows through among diodes in the rectifier unit 31 changes depending on a size of a phase voltage of each phase of the motor 3. For example, FIG. 2 illustrates a flow of a current at a certain moment. The energy (alternating current power) on the basis of the counter electromotive force generated when the alarm signal is output from the alarm signal output unit 15 and thus the motor 3 is urgently stopped is consumed by the motor windings having the phases in the short-circuit state via the rectifier unit 31 and the short-circuit unit 32 in the counter electromotive force protection circuit 17. Thus, as long as the counter electromotive force protection circuit 17 does not break down, a significant increase in the DC link voltage can be prevented, and there is no risk of breakage of the DC link capacitor 4.

Figure 3:
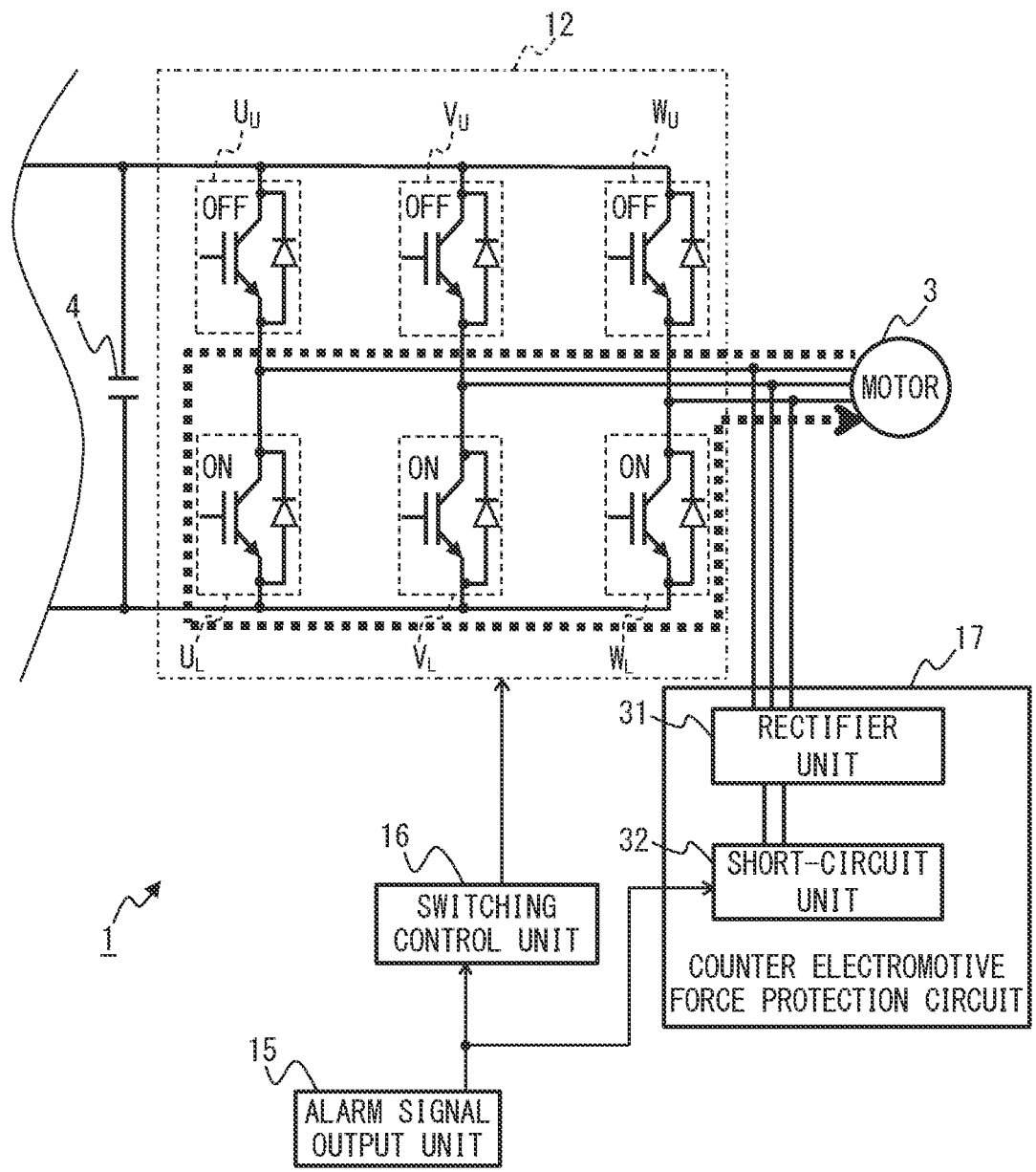
FIG. 3 is a diagram illustrating a flow of a current when all switching devices of lower arms in an inverter are turned on in the motor control apparatus according to the first to fifth embodiments of the present disclosure.

FIG. 3 is a diagram illustrating a flow of a current when all of the switching devices of the lower arms in the inverter are turned on in the motor control apparatus according to the first to fifth embodiments of the present disclosure. FIG. 3 is applicable to not only the first embodiment but also the second to fifth embodiments described below (when a resistor 41 is not electrically connected to the lower arm). In FIG. 3, the alternating current power supply 2, the converter 11, the DC link voltage detection unit 13, the DC link voltage determination unit 14, the recording unit 18, the display unit 19, and the external device control unit 20 are omitted.

When all of the switching devices of the lower arms $U_L$, $V_L$, and $W_L$ in the inverter 12 are turned on, the phases of the motor windings of the motor 3 are in the short-circuit state by action of the switching devices and the diodes the ON state of the lower arms $U_L$, $V_L$, and $W_L$ regardless of ON/OFF of all of the switching devices of the upper arms $U_U$, $V_U$, and $W_U$. The energy on the basis of the counter electromotive force generated when the alarm signal is output from the alarm signal output unit 15 and thus the motor 3 is urgently stopped is consumed by the motor windings having the phases in the short-circuit state and the switching devices of the lower arms $U_L$, $V_L$, and $W_L$. Since all of the switching devices of the lower arms $U_L$, $V_L$, and $W_L$ are turned on, the energy on the basis of the counter electromotive force does not flow into the DC link capacitor 4. Which phase of a switching device and a diode a current flows through among the switching devices and the diodes of respective phases of the lower arms $U_L$, $V_L$, and $W_L$ in the inverter 12 changes depending on the size of the phase voltage of each phase of the motor 3. For example, FIG. 3 illustrates a flow of a current at a certain moment, and a current flowing from a U phase terminal of the motor 3 flows into a U phase terminal of the motor 3 via the switching device of the lower arm $U_L$ of the U phase and the diode of the lower arm $W_L$ of the W phase.

When the short-circuit unit 32 in the counter electromotive force protection circuit 17 breaks down and the terminals on the direct current output side of the rectifier unit 31 are not short-circuited even though the alarm signal output from the alarm signal output unit 15, a flow of the energy as illustrated in FIG. 2 is not generated, and the DC link voltage gradually increases. In the first embodiment and the second to fifth embodiments described below, when it is determined that the DC link voltage exceeds the voltage threshold value $V_{th1}$, the switching control unit 16 performs control in such a way as to turn on all of the switching devices of the lower arms $U_L$, $V_L$, and $W_L$, and thus the energy on the basis of the counter electromotive force is consumed by the motor windings having the phases in the short-circuit state and the switching devices of the lower arms $U_L$, $V_L$, and $W_L$. Thus, according to the first embodiment, even when the short-circuit unit 32 in the counter electromotive force protection circuit 17 breaks down, a significant increase in the DC link voltage can be prevented, and there is no risk of breakage of the DC link capacitor 4.

Figure 4:
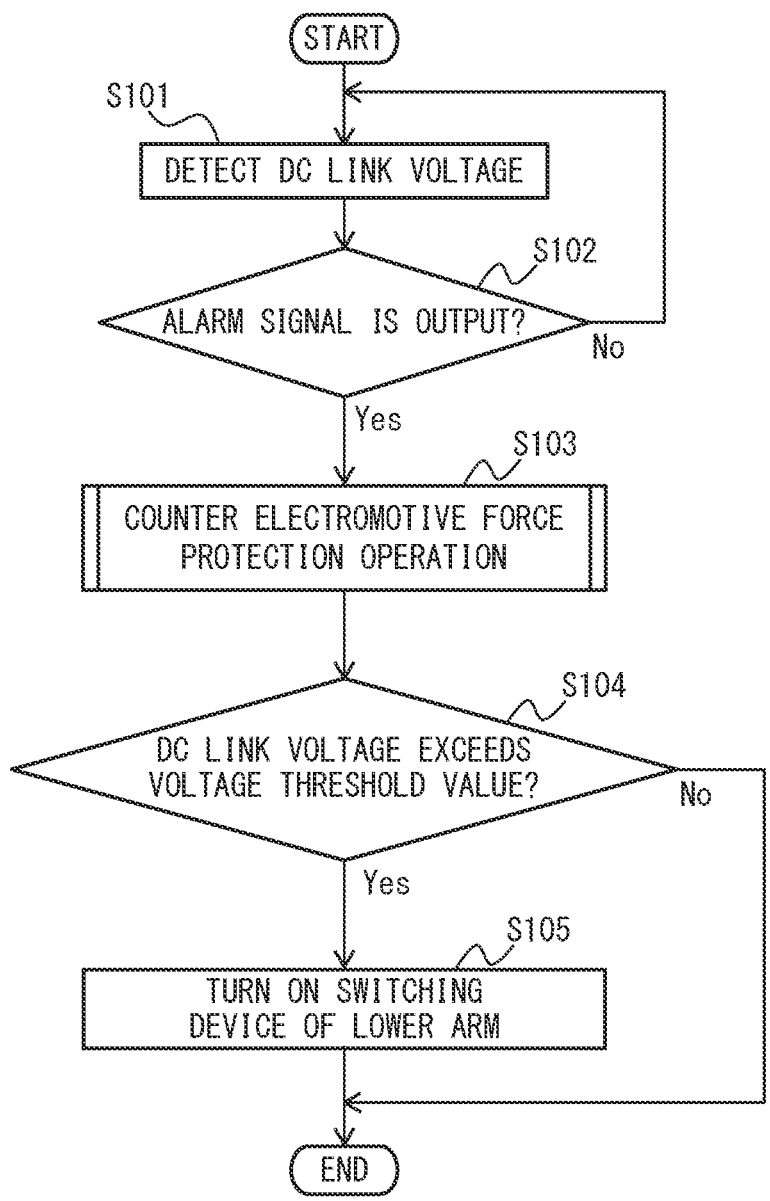
FIG. 4 is a flowchart illustrating an operation flow of the motor control apparatus according to the first embodiment of the present disclosure.

FIG. 4 is a flowchart illustrating an operation flow of the motor control apparatus according to the first embodiment of the present disclosure.

When driving of the motor 3 is performed with alternating current power output from the inverter 12 by the switching device in the inverter 12 being subjected to ON/OFF control on the basis of a command of the switching control unit 16, in step S101, the DC link voltage detection unit 13 detects a DC link voltage being a voltage between terminals of the DC link. A value of the DC link voltage detected by the DC link voltage detection unit 13 is transmitted to the DC link voltage determination unit 14.

In step S102, the switching control unit 16 determines whether an alarm signal is output from the alarm signal output unit 15. For example, when an overcurrent, an overvoltage, a low voltage, or abnormal heat generation is detected by various detection units (not illustrated) in a circuit of the motor control apparatus 1, or when a power failure of the alternating current power supply 2 is detected by a power failure detection unit (not illustrated), the alarm signal output unit 15 outputs the alarm signal. In step S102, when it is determined that the alarm signal is output from the alarm signal output unit 15, processing proceeds to step S103, and, when it is not determined that the alarm signal is output from the alarm signal output unit 15, the processing returns to step S101.

The processing in steps S101 and S102 is executed in a predetermined control period (for example, approximately a few milliseconds).

In step S103, the counter electromotive force protection circuit 17 operates the short-circuit unit 32, and short-circuits the terminals on the direct current output side of the rectifier unit 31. Herein, as long as the counter electromotive force protection circuit 17 normally operates, all the energy on the basis of the counter electromotive force generated when the alarm is output in step S102 is consumed by the motor windings having the phases in the short-circuit state via the rectifier unit 31 and the short-circuit unit 32 in the counter electromotive force protection circuit 17 to stop the motor 3, and the DC link voltage does not significantly increase. However, when the counter electromotive force protection circuit 17 breaks down and the terminals on the direct current output side of the rectifier unit 31 are not short-circuited even though the alarm signal is output from the alarm signal output unit 15, the DC link voltage gradually increases.

In step S104, the DC link voltage determination unit 14 determines whether the DC link voltage exceeds the voltage threshold value $V_{th1}$. A determination result by the DC link voltage determination unit 14 is transmitted to the switching control unit 16. In step S104, when it is determined that the DC link voltage exceeds the voltage threshold value $V_{th1}$, the processing proceeds to step S105, and, when it is not determined that the DC link voltage exceeds the voltage threshold value $V_{th1}$, the processing ends.

In step S105, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. In this way, the phases of the motor windings of the motor 3 are in the short-circuit state by action of the switching devices and the diodes in the ON state of the lower arms $U_L$, $V_L$, and $W_L$. The energy on the basis of the counter electromotive force is consumed by the motor windings having the phases in the short-circuit state and the switching devices in the ON state of the lower arms $U_L$, $V_L$, and $W_L$ to stop the motor 3, and the DC link voltage does not increase. Further, although not illustrated in FIG. 4, processing in which the recording unit 18, the display unit 19, and the external device control unit 20 record or display the operation of "turning on all of the switching devices of the lower arms $U_L$, $V_L$, and $W_L$" being performed is executed. Subsequently, the processing ends.

Then, the second embodiment will be described with reference to FIGS. 5 and 6. The second embodiment includes a switching device protection circuit provided in each of the lower arms in the motor control apparatus according to the first embodiment.

Figure 5:
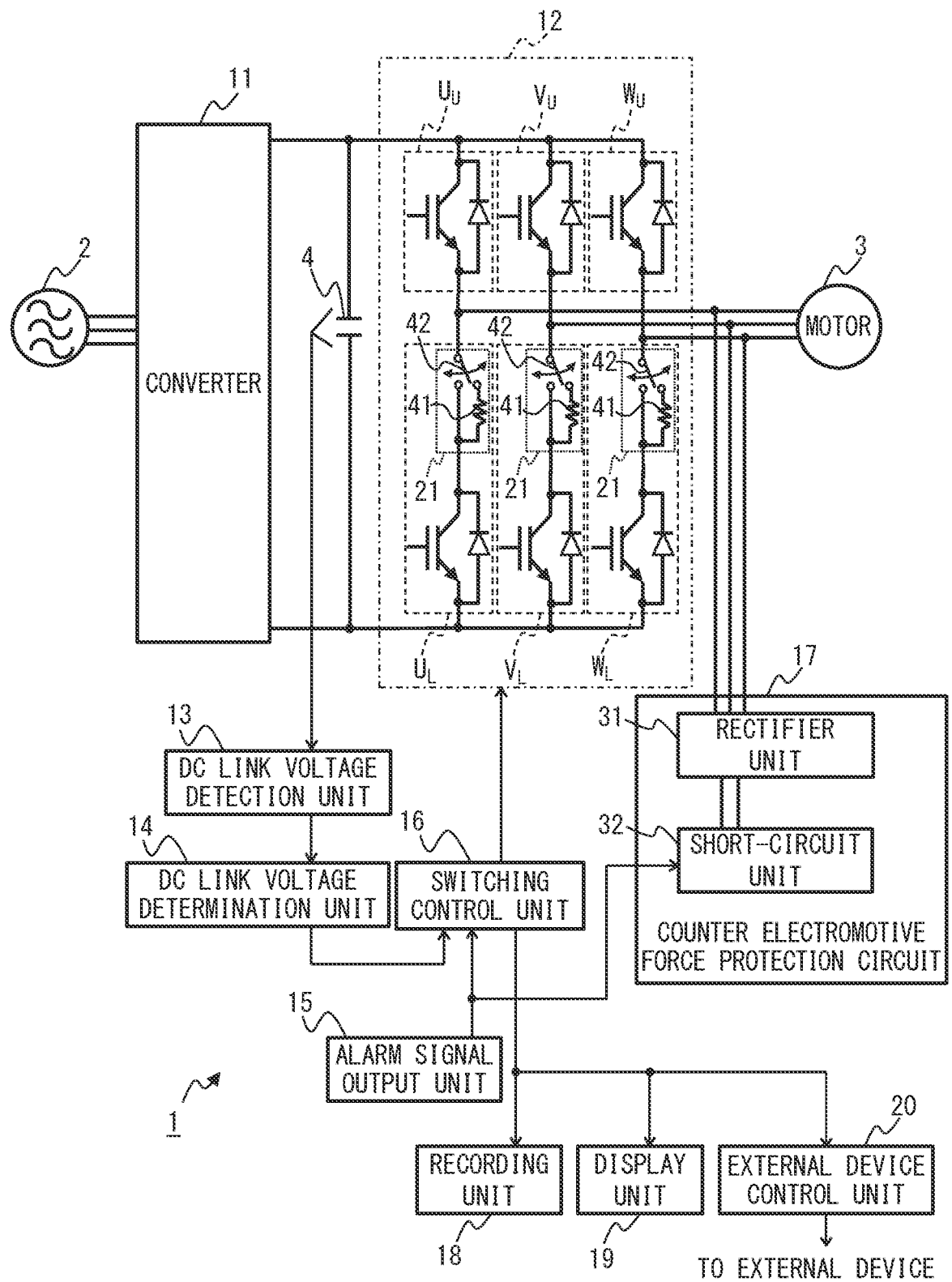
FIG. 5 is a diagram illustrating a motor control apparatus according to a second embodiment of the present disclosure.

FIG. 5 is a diagram illustrating a motor control apparatus according to the second embodiment of the present disclosure.

As illustrated in FIG. 5, a motor control apparatus 1 according to the second embodiment of the present disclosure further includes a switching device protection circuit 21 connected in series to a group of the diode and the switching device in each of the lower arms $U_L$, $V_L$, and $W_L$ in addition to the circuit components in the motor control apparatus 1 according to the first embodiment. The switching device protection circuit 21 includes a resistor 41, and a switching switch 42 that selectively switches between electrical connection and electrical disconnection between the resistor 41 and each of the lower arms $U_L$, $V_L$, and $W_L$. As an example of the switching switch 42, there are an IGBT, an FET, a thyristor, a GTO, a transistor, and the like, but the switching switch 42 may be another semiconductor device. A switching operation by the switching switch 42 is controlled by the switching control unit 16, for example, but a control unit (not illustrated) different from the switching control unit 16 may be provided.

When the motor control apparatus 1 operates under a normal state and when the DC link voltage determination unit 14 does not determine that the DC link voltage exceeds the voltage threshold value $V_{th1}$ even though the alarm signal output from the alarm signal output unit 15, the switching switch 42 does not connect the resistor 41 to the lower arm. Thus, a current does not flow through the resistor 41.

When the alarm signal is output from the alarm signal output unit 15 and the DC link voltage determination unit 14 determines that the DC link voltage exceeds the voltage threshold value $V_{th1}$, the switching switch 42 electrically connects the resistor 41 to each of the lower arms $U_L$, $V_L$, and $W_L$. Thus, a current flows through the resistor 41. Subsequently, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. The energy on the basis of the counter electromotive force from the motor 3 flows through the switching switch 42, the resistor 41, and the switching devices of the lower arms $U_L$, $V_L$, and $W_L$ in the ON state. As a result, the energy on the basis of the counter electromotive force is consumed by not only the motor windings having the phases in the short-circuit state and the switching devices of the lower arms $U_L$, $V_L$, and $W_L$ in the ON state but also by the resistor 41, and thus breakage of the switching devices of the lower arms $U_L$, $V_L$, and $W_L$ can be avoided. Thus, according to the second embodiment, breakage of the DC link capacitor 4 and the switching devices of the lower arms $U_L$, $V_L$, and $W_L$ can be avoided.

In the second embodiment, the operation of the circuit components except for the switching device protection circuit 21 and the switching control unit 16 is similar to the operation of the circuit components illustrated in FIG. 1.

Figure 6:
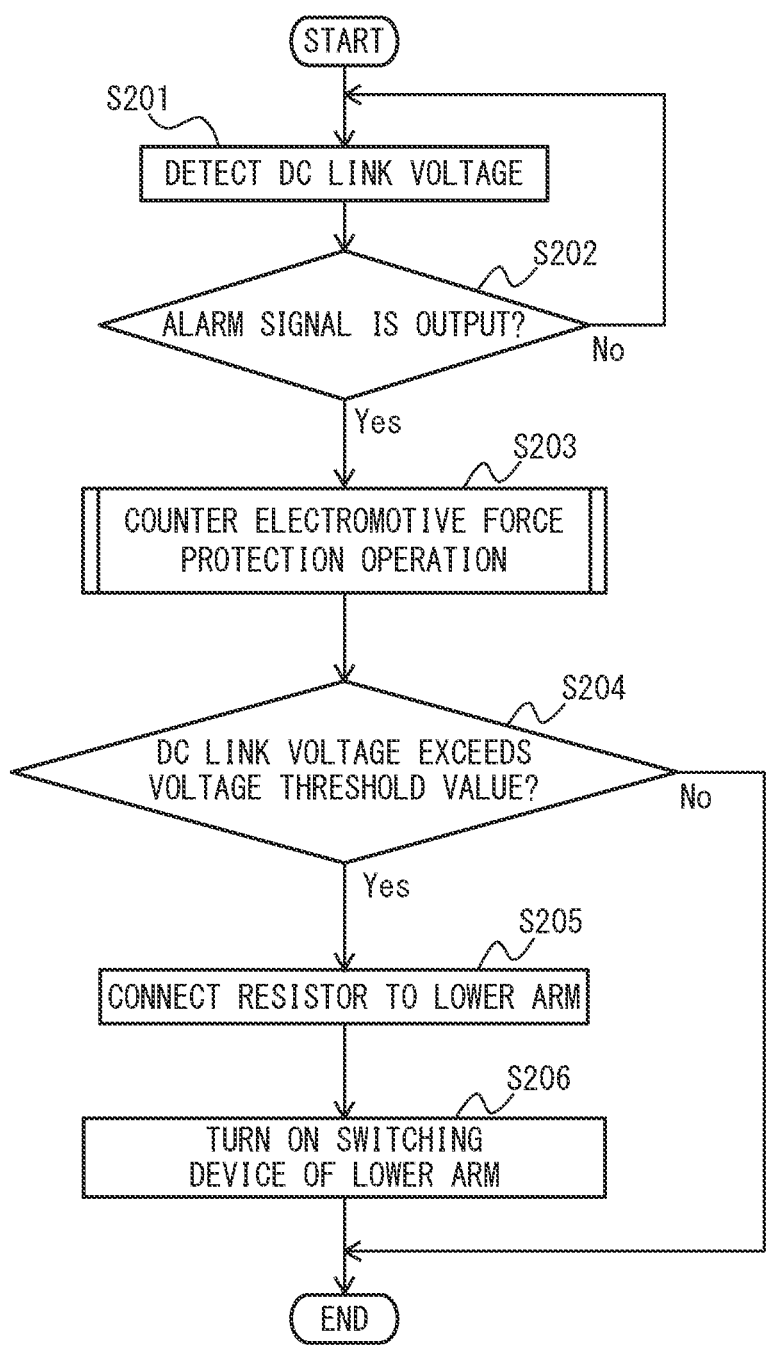
FIG. 6 is a flowchart illustrating an operation flow of the motor control apparatus according to the second embodiment of the present disclosure.

FIG. 6 is a flowchart illustrating an operation flow of the motor control apparatus according to the second embodiment of the present disclosure.

Each processing in steps S201 to S203 is similar to each processing in steps S101 to S103 described with reference to FIG. 4.

In step S204, the DC link voltage determination unit 14 determines whether the DC link voltage exceeds the voltage threshold value $V_{th1}$. A determination result by the DC link voltage determination unit 14 is transmitted to the switching control unit 16. In step S204, when it is determined that the DC link voltage exceeds the threshold value $V_{th1}$, the processing proceeds to step S205, and, when it is not determined that the DC link voltage exceeds the threshold value $V_{th1}$, the processing ends.

In step S205, the switching switch 42 electrically connects the resistor 41 to each of the lower arms $U_L$, $V_L$, and $W_L$. Thus, a current flows through the resistor 41.

In step S206, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. In this way, the phases of the motor windings of the motor 3 are in the short-circuit state by action of the switching devices and the diodes in the ON state of the lower arms $U_L$, $V_L$, and $W_L$. The energy on the basis of the counter electromotive force is consumed by the motor windings having the phases in the short-circuit state, the resistor 41 in the switching device protection circuit 21, and the switching devices in the ON state of the lower arms $U_L$, $V_L$, and $W_L$ to stop the motor 3, and the DC link voltage does not increase. Further, although not illustrated in FIG. 6, processing in which the recording unit 18, the display unit 19, and the external device control unit 20 record or display the operation of "turning on all of the switching devices of the lower arms $U_L$, $V_L$, and $W_L$" being performed is executed. Subsequently, the processing ends.

Then, a third embodiment will be described with reference to FIGS. 7 and 8. The third embodiment causes the switching switch in the switching device protection circuit to operate in response to a temperature of the switching device of the lower arm in the motor control apparatus according to the second embodiment.

Figure 7:
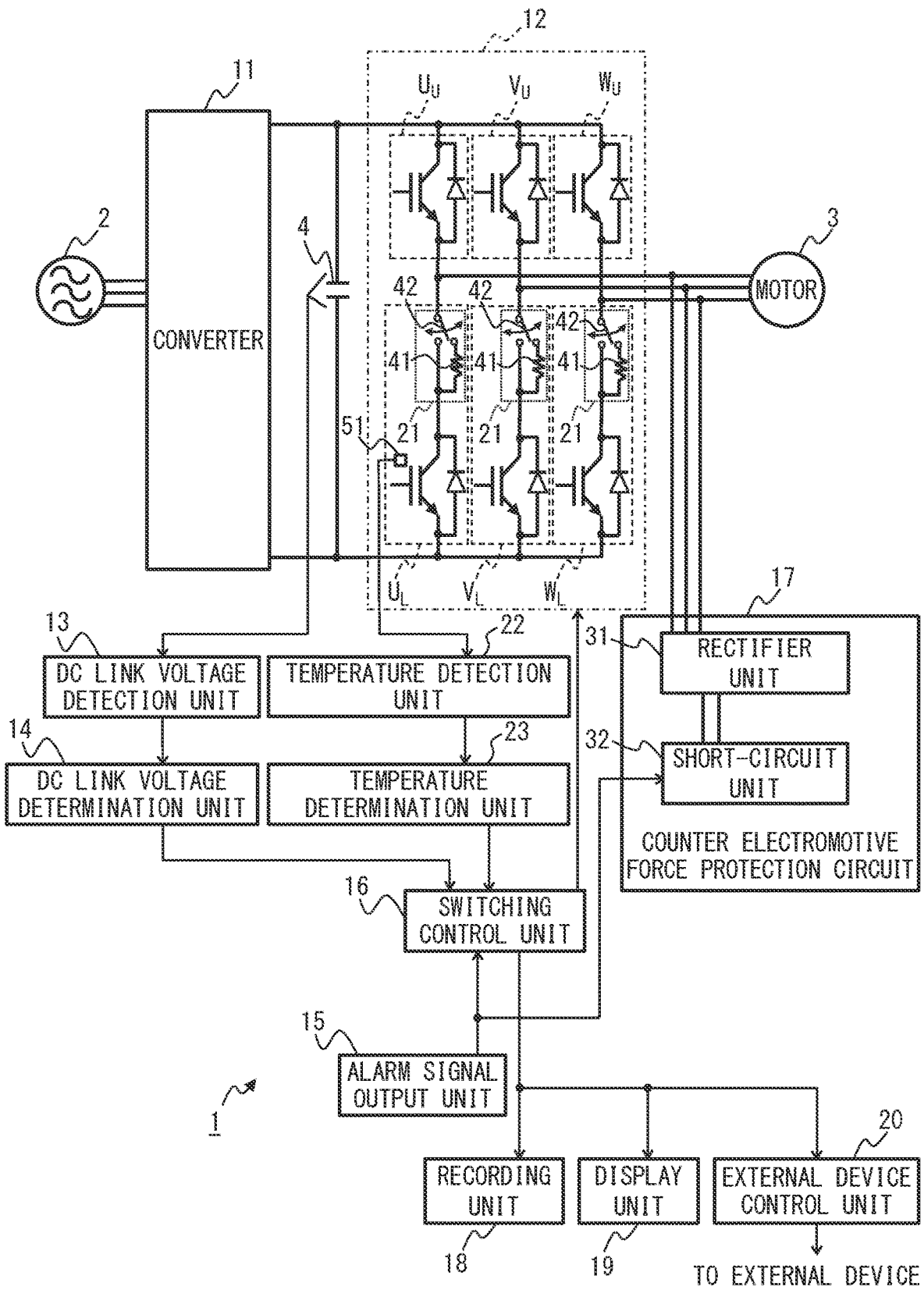
FIG. 7 is a diagram illustrating a motor control apparatus according to a third embodiment of the present disclosure.

FIG. 7 is a diagram illustrating the motor control apparatus according to the third embodiment of the present disclosure.

As illustrated in FIG. 7, a motor control apparatus 1 according to the third embodiment of the present disclosure further includes a temperature detection unit 22 and a temperature determination unit 23 in addition to the circuit components in the motor control apparatus 1 according to the second embodiment.

A temperature sensor 51 is provided in the vicinity of each of the switching devices of the lower arms $U_L$, $V_L$, and $W_L$. The temperature sensor 51 is preferably installed on a portion that generates the most heat of each of the switching devices of the lower arms $U_L$, $V_L$, and $U_L$. Note that, in FIG. 7, in order to simplify the drawing, only the temperature sensor provided in the vicinity of the switching device of the lower arm $U_L$ of the U phase, and the temperature sensors provided in the vicinity of the switching devices of the lower arm $V_L$ of the V phase and the lower arm $W_L$ of the W phase are omitted. Note that, in order to reduce cost, the temperature sensor 51 may not be provided to all of the switching devices of the lower arms $U_L$, $V_L$, and $W_L$ and may be provided to any one or two of the switching devices of the lower arms $U_L$, $V_L$, and $W_L$.

The temperature detection unit 22 detects a temperature of the switching devices of the lower arms $U_L$, $V_L$, and $W_L$ via the temperature sensor 51. The detected temperature of the switching devices is transmitted to the temperature determination unit 23. For example, when the temperature sensor 51 is provided to all of the switching devices of the lower arms $U_L$, $V_L$, and $W_L$, the temperature detection unit 22 detects, as a "temperature of the switching devices", an average value of temperatures of the three switching devices for the lower arms $U_L$, $V_L$, and $W_L$ or a maximum temperature of temperatures of the three switching devices for the lower arms $U_L$, $V_L$, and $W_L$. For example, when the temperature sensor 51 is provided to two of the switching devices of the lower arms $U_L$, $V_L$, and $W_L$, the temperature detection unit 22 detects, as a "temperature of the switching devices", an average value of temperatures of the two switching devices or a maximum temperature of temperatures of the two switching devices. For example, when the temperature sensor 51 is provided to one of the switching devices of the lower arms $U_L$, $V_L$, and $W_L$, the temperature detection unit 22 detects a temperature of the one switching device as a "temperature of the switching devices".

The temperature determination unit 23 determines whether the temperature of the switching devices detected by the temperature detection unit 22 exceeds a temperature threshold value $T_{th}$. The temperature threshold value $T_{th}$ may be set to a value lower than an allowable temperature of the switching devices by approximately a few percent to a dozen percent, for example, in consideration of safety. The numerical example indicated herein is merely one example, and another value may be set. As the allowable temperature of the switching devices, for example, a value defined as one piece of specification data in a specification table, an instruction manual, or the like of the switching devices may be used. Note that the temperature threshold value $T_{th}$ may be stored in a rewritable storage unit (not illustrated) and be rewritable by external equipment, and can be changed to an appropriate value as necessary even after the temperature threshold value $T_{th}$ is set once. A determination result by the temperature determination unit 23 is transmitted to the switching control unit 16.

When the motor control apparatus 1 operates under a normal state, when the DC link voltage determination unit 14 does not determine that the DC link voltage exceeds the voltage threshold value $V_{th1}$ even though the alarm signal is output from the alarm signal output unit 15, and when the temperature determination unit 23 does not determine that the temperature of the switching devices exceeds the temperature threshold value $T_{th}$ even though the alarm signal is output from the alarm signal output unit 15 and the DC link voltage determination unit 14 determines that the DC link voltage exceeds the voltage threshold value $V_{th1}$, the switching switch 42 does not connect the resistor 41 to each of the lower arms $U_L$, $V_L$, and $W_L$. Thus, a current does not flow through the resistor 41.

In a case where the alarm signal is output from the alarm signal output unit 15 and the DC link voltage determination unit 14 determines that the DC link voltage exceeds the voltage threshold value $V_{th1}$, when the temperature determination unit 23 determines that the temperature of the switching devices exceeds the temperature threshold value $T_{th}$, the switching switch 42 electrically connects the resistor 41 to each of the lower arms $U_L$, $V_L$, and $W_L$. Thus, a current flows through the resistor 41. Subsequently, the switching control unit 16 performs control in such a way as to turn on all of the switching devices of the lower arms $D_L$, $V_L$, and $W_L$. At this time, any of ON control and OFF control may be performed on the switching devices of the upper arms $U_U$, $V_U$, and $W_U$. According to the third embodiment, when a temperature of the switching devices of the lower arms $U_L$, $V_L$, and $W_L$ exceeds the temperature threshold value $T_{th}$ set to a value lower than the allowable temperature, the resistor 41 is electrically connected to the lower arms $U_L$, $V_L$, and $W_L$. In this way, most of the energy on the basis of the counter electromotive force is consumed by the resistor 41 and the motor windings having the phases in the short-circuit state, and thus abnormal heat generation of the switching devices of the lower arms $U_L$, $V_L$, and $W_L$ is avoided. In this way, also in the third embodiment, breakage of the DC link capacitor 4 and the switching devices of the lower arms $U_L$, $V_L$, and $W_L$ can be avoided.

In the third embodiment, the operation of the circuit components except for the temperature sensor 51, the temperature detection unit 22, the temperature determination unit 23, and the switching device protection circuit 21 is similar to the operation of the circuit components illustrated in FIG. 5.

Figure 8:
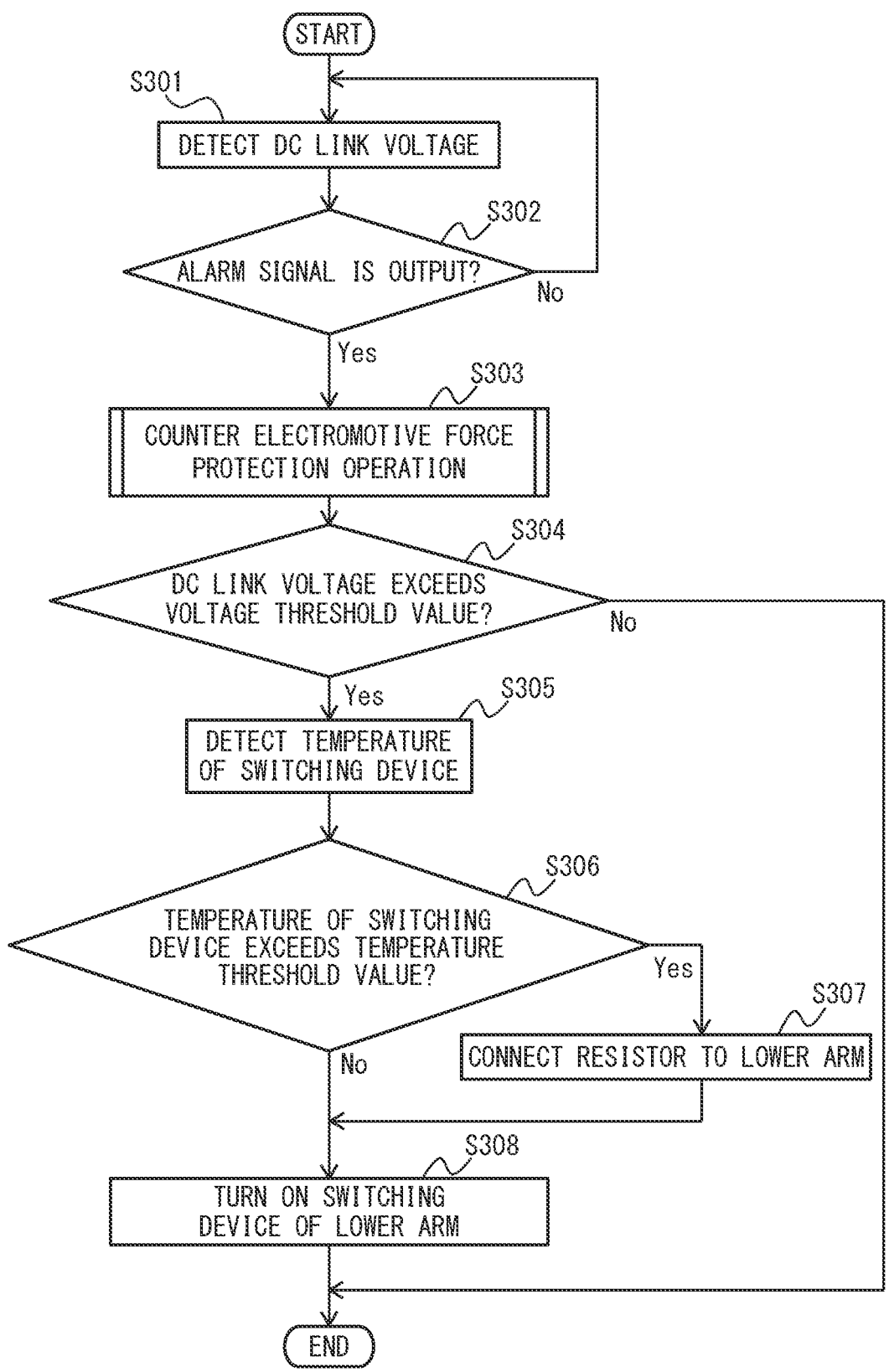
FIG. 8 is a flowchart illustrating an operation flow of the motor control apparatus according to the third embodiment of the present disclosure.

FIG. 8 is a flowchart illustrating an operation flow of the motor control apparatus according to the third embodiment of the present disclosure.

Each processing in steps S301 to S303 is similar to each processing in steps S101 to S103 described with reference to FIG. 4.

In step S304, the DC link voltage determination unit 14 determines whether the DC link voltage exceeds the voltage threshold value $V_{th1}$. A determination result by the DC link voltage determination unit 14 is transmitted to the switching control unit 16. In step S304, when it is determined that the DC link voltage exceeds the threshold value $V_{th1}$, the processing proceeds to step S305, and, when it is not determined that the DC link voltage exceeds the threshold value the processing ends.

In step S305, the temperature detection unit 22 detects a temperature of the switching devices of the lower arms $U_L$, $V_L$, and $W_L$ via the temperature sensor 51. The temperature of the switching devices detected by the temperature detection unit 22 is transmitted to the temperature determination unit 23.

In step S306, the temperature determination unit 23 determines whether the temperature of the switching devices detected by the temperature detection unit 22 exceeds the temperature threshold value $T_{th}$. A determination result by the temperature determination unit 23 is transmitted to the switching control unit 16. In step S306, when it is determined that the temperature of the switching devices exceeds the temperature threshold value $T_{th}$, the processing proceeds to step S307, and, when it is not determined that the temperature of the switching devices exceeds the temperature threshold value $T_{th}$, the processing proceeds to step S308.

In step S307, the switching switch 42 electrically connects the resistor 41 to each of the lower arms $U_L$, $V_L$, and $W_L$. Thus, a current flows through the resistor 41. Subsequently, the processing proceeds to step S308.

In step S308, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. Further, although not illustrated in FIG. 8, processing in which the recording unit 18, the display unit 19, and the external device control unit 20 record or display the operation of "turning on all of the switching devices of the lower arms $U_L$, $V_L$, and $W_L$" being performed is executed. Subsequently, the processing ends.

Then, a fourth embodiment will be described with reference to FIGS. 9 and 10. The fourth embodiment causes the switching switch in the switching device protection circuit to operate in response to a current flowing through the switching device of the lower arm in the motor control apparatus according to the second embodiment.

Figure 9:
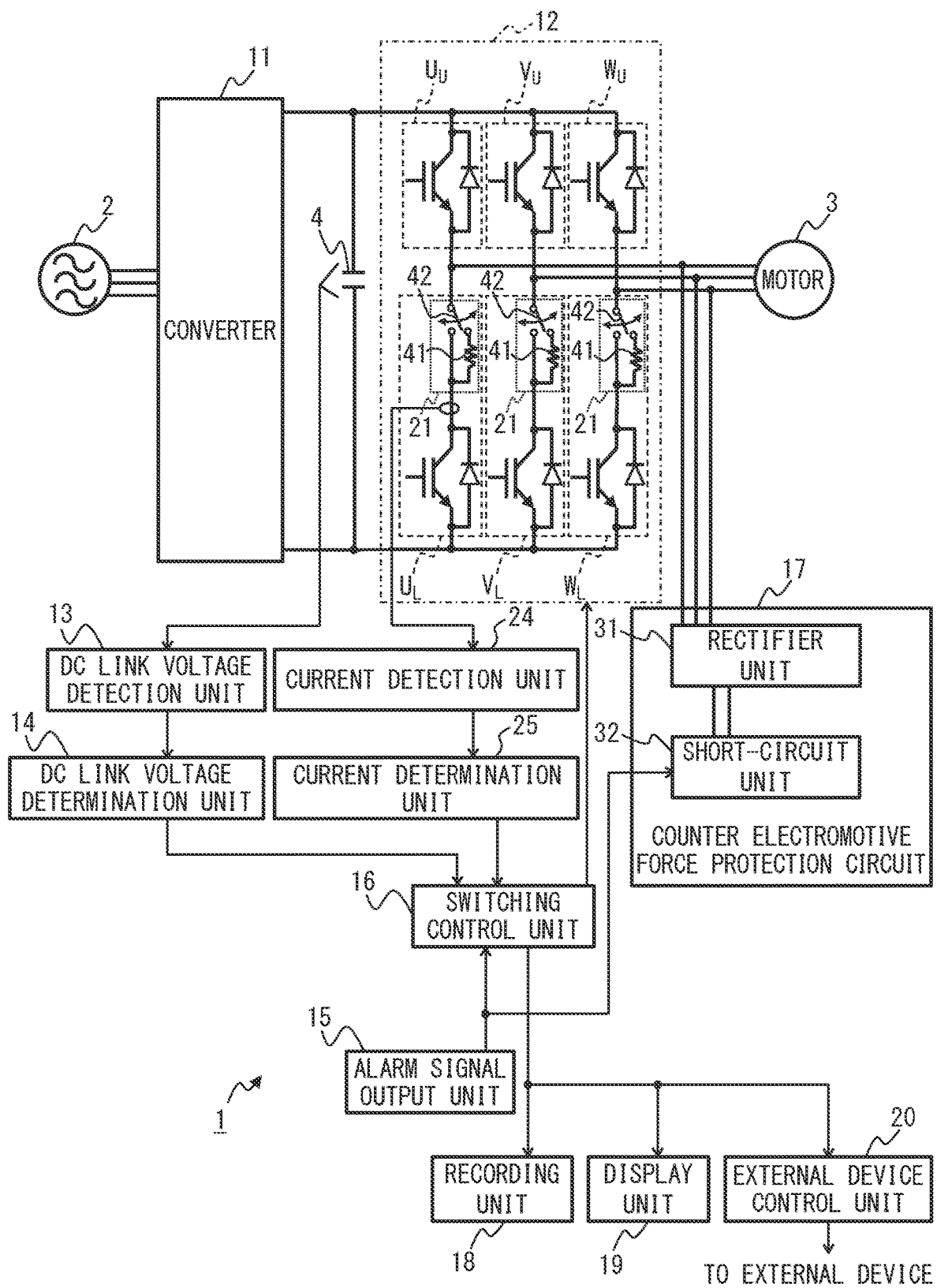
FIG. 9 is a diagram illustrating a motor control apparatus according to a fourth embodiment of the present disclosure.

FIG. 9 is a diagram illustrating the motor control apparatus according to the fourth embodiment of the present disclosure.

As illustrated in FIG. 9, a motor control apparatus 1 according to the fourth embodiment of the present disclosure further includes a current detection unit 24 and a current determination unit 25 in addition to the circuit components in the motor control apparatus 1 according to the second embodiment.

The current detection unit 24 detects a current flowing through the switching devices of the lower arms $U_L$, $V_L$, and $W_L$. The current detection unit 24 detects a current flowing between a collector and an emitter when the switching device is an IGBT and a transistor, a current flowing between a drain and a source when the switching device is an FET, and a current flowing between an anode and a cathode when the switching device is a thyristor and a GTO. A value of the current flowing through the switching devices detected by the current detection unit 24 is transmitted to the current determination unit 25.

In FIG. 9, in order to simplify the drawing, only a mechanism for detecting a current flowing through the switching device of the lower arm $U_L$ of the U phase, and mechanisms for detecting a current flowing through the switching devices of the lower arm $V_L$ of the V phase and the lower arm $W_L$ of the W phase are omitted. Note that, in order to reduce cost, a switching device serving as a detection target of a current may be any one or two of the switching devices of the lower arms $U_L$, $V_L$, and $W_L$. For example, when the current detection unit 24 detects a current flowing through all of the switching devices of the lower arms $U_L$, $V_L$, and $W_L$, the current detection unit 24 detects, as a "current flowing through the switching devices", an average value of current flowing through the three switching devices for the lower arms $U_L$, $V_L$, and $W_L$ or a maximum value among values of current flowing through the three switching devices for the lower arms $U_L$, $V_L$, and $W_L$. For example, when the current detection unit 24 detects a current flowing through two of the switching devices of the lower arms $U_L$, $V_L$, and $W_L$, the current detection unit 24 detects, as a "current flowing through the switching devices", an average value of current flowing through the two switching devices for the lower arms $U_L$, $V_L$, and $W_L$ or a maximum value among values of current flowing through the two switching devices for the lower arms $U_L$, $V_L$, and $W_L$. For example, when the current detection unit 24 detects a current flowing through one of the switching devices of the lower arms $U_L$, $V_L$, and $W_L$, the current detection unit 24 detects a value of current flowing through the one switching device as a "current flowing through the switching devices".

The current determination unit 25 determines whether the current of the switching devices detected by the current detection unit 24 exceeds a current threshold value $I_{th}$. The current threshold value $I_{th}$ may be set to a value lower than a maximum rated current of the switching devices by approximately a few percent to a dozen percent, for example, in consideration of safety. The numerical example indicated herein is merely one example, and another value may be set. As the maximum rated current of the switching devices, for example, a value defined as one piece of specification data in a specification table, an instruction manual, or the like of the switching devices may be used. Note that the current threshold value $I_{th}$ may be stored in a rewritable storage unit (not illustrated) and be rewritable by external equipment, and can be changed to an appropriate value as necessary even after the current threshold value $I_{th}$ is set once. A determination result by the current determination unit 25 is transmitted to the switching control unit 16.

When the motor control apparatus 1 operates under a normal state, when the DC link voltage determination unit 14 does not determine that the DC link voltage exceeds the voltage threshold value $V_{th1}$ even though the alarm signal is output from the alarm signal output unit 15, and when the current determination unit 25 does not determine that the current flowing through the switching devices exceeds the current threshold value $I_{th}$ even though the alarm signal is output from the alarm signal output unit 15 and the DC link voltage determination unit 14 determines that the DC link voltage exceeds the voltage threshold value the switching switch 42 does not connect the resistor 41 to each of the lower arms $U_L$, $V_L$, and $W_L$. Thus, a current does not flow through the resistor 41.

In a case where the alarm signal is output from the alarm signal output unit 15 and the DC link voltage determination unit 14 determines that the DC link voltage exceeds the voltage threshold value $V_{th1}$, when the current determination unit 25 determines that the detected current flowing through the switching devices exceeds the current threshold value $I_{th}$, the switching switch 42 electrically connects the resistor 41 to each of the lower arms $U_L$, $V_L$, and $W_L$. Thus, a current flows through the resistor 41. Subsequently, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. According to the fourth embodiment, when a current flowing through the switching devices of the lower arms $U_L$, $V_L$, and $W_L$ exceeds the current threshold value $I_{th}$ set to a value lower than the maximum rated current, the resistor 41 is electrically connected to the lower arms $U_L$, $V_L$, and $W_L$. In this way, most of the energy on the basis of the counter electromotive force is consumed by the resistor 41 and the motor windings having the phases in the short-circuit state, and thus an excessive current flowing through the switching devices of the lower arms $U_L$, $V_L$, and $W_L$ can be avoided. In this way, also in the fourth embodiment, breakage of the DC link capacitor 4 and the switching devices of the lower arms $U_L$, $V_L$, and $W_L$ can be avoided.

In the fourth embodiment, the operation of the circuit components except for the current detection unit 24, the current determination unit 25, and the switching device protection circuit 21 is similar to the operation of the circuit components illustrated in FIG. 5.

Figure 10:
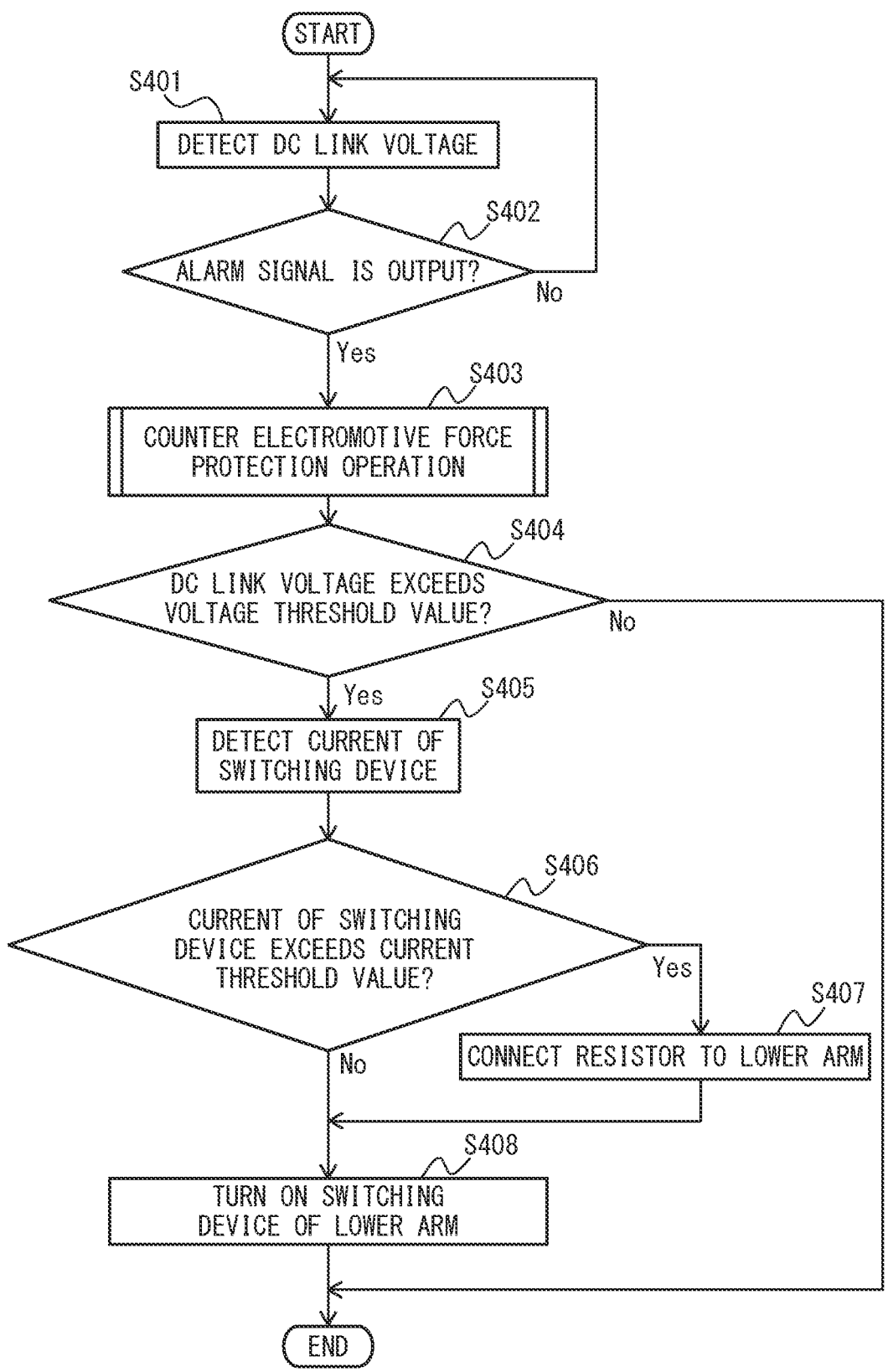
FIG. 10 is a flowchart illustrating an operation flow of the motor control apparatus according to the fourth embodiment of the present disclosure.

FIG. 10 is a flowchart illustrating an operation flow of the motor control apparatus according to the fourth embodiment of the present disclosure.

Each processing in steps S401 to S403 is similar to each processing in steps S101 to S103 described with reference to FIG. 4.

In step S404, the DC link voltage determination unit 14 determines whether the DC link voltage exceeds the voltage threshold value $V_{th1}$. A determination result by the DC link voltage determination unit 14 is transmitted to the switching control unit 16. In step S404, when it is determined that the DC link voltage exceeds the threshold value $V_{th1}$, the processing proceeds to step S405, and, when it is not determined that the DC link voltage exceeds the threshold value $V_{th1}$, the processing ends.

In step S405, the current detection unit 24 detects a current flowing through the switching devices of the lower arms $U_L$, $V_L$, and $W_L$. A value of the current flowing through the switching devices detected by the current detection unit 24 is transmitted to the current determination unit 25.

In step S406, the current determination unit 25 determines whether the current of the switching devices detected by the current detection unit 24 exceeds the current threshold value $I_{th}$. A determination result by the current determination unit 25 is transmitted to the switching control unit 16. In step S406, when it is determined that the current of the switching devices exceeds the current threshold value $I_{th}$, the processing proceeds to step S407, and, when it is not determined that the current of the switching devices exceeds the current threshold value $I_{th}$, the processing proceeds to step S408.

In step S407, the switching switch 42 electrically connects the resistor 41 to each of the lower arms $U_L$, $V_L$, and $W_L$. Thus, a current flows through the resistor 41. Subsequently, the processing proceeds to step S408.

In step S408, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. Further, although not illustrated in FIG. 10, processing in which the recording unit 18, the display unit 19, and the external device control unit 20 record or display the operation of "turning on all of the switching devices of the lower arms $U_L$, $V_L$, and $W_L$" being performed is executed. Subsequently, the processing ends.

Then, a fifth embodiment will be described with reference to FIGS. 11 and 12. The fifth embodiment causes the switching switch in the switching device protection circuit to operate in response to a switching device voltage being a potential difference in a conduction direction of the switching device of the lower arm in the motor control apparatus according to the second embodiment.

Figure 11:
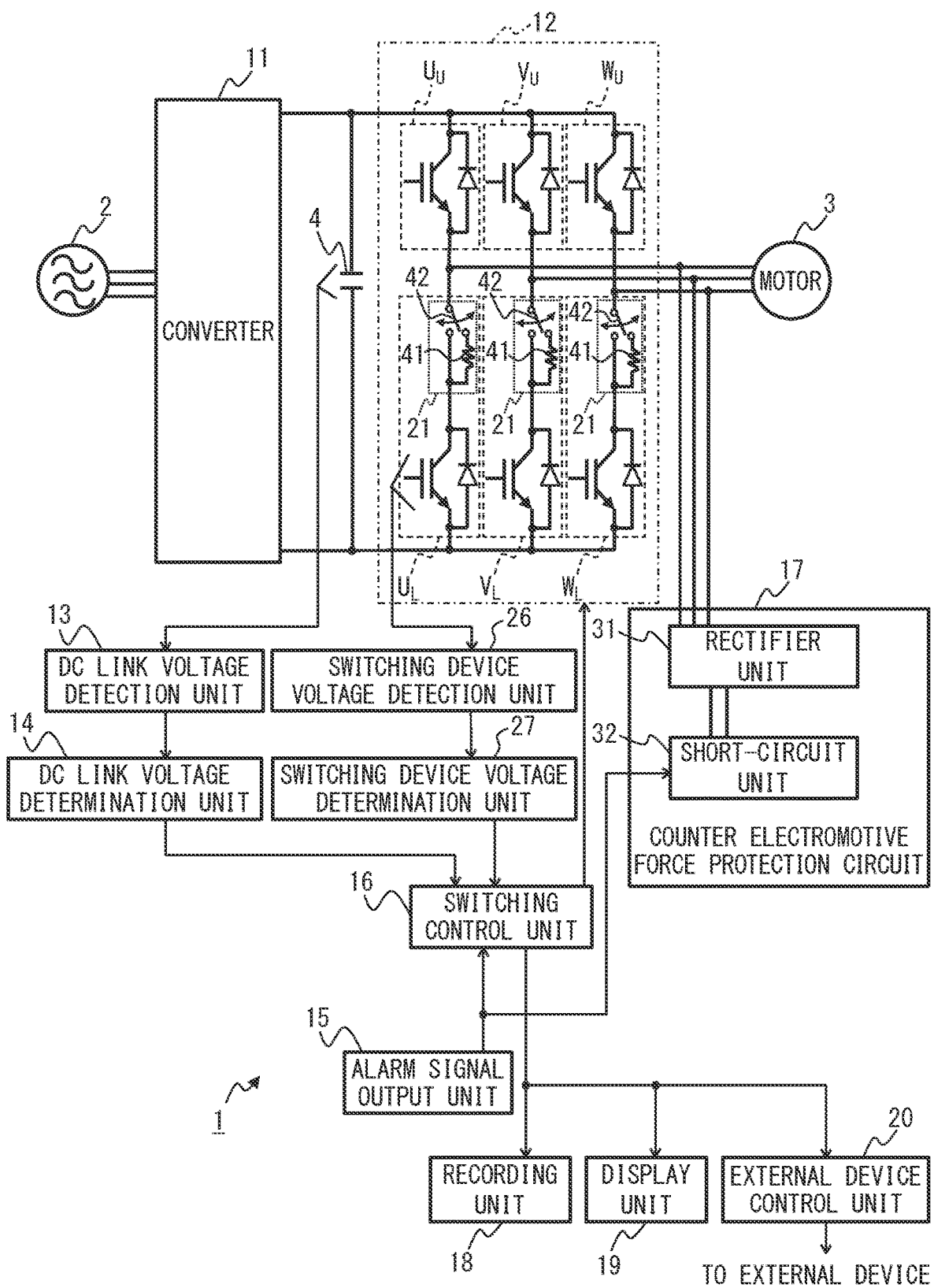
FIG. 11 is a diagram illustrating a motor control apparatus according to a fifth embodiment of the present disclosure.

FIG. 11 is a diagram illustrating the motor control apparatus according to the fifth embodiment of the present disclosure.

As illustrated in FIG. 11, a motor control apparatus 1 according to the fifth embodiment of the present disclosure further includes a switching device voltage detection unit 26 and a switching device voltage determination unit 27 in addition to the circuit components in the motor control apparatus 1 according to the second embodiment.

The switching device voltage detection unit 26 detects a switching device voltage being a potential difference in a conduction direction of the switching devices of the lower arms $U_L$, $V_L$, and $W_L$. A value of the switching device voltage detected by the switching device voltage detection unit 26 is transmitted to the switching control unit 16. The switching device voltage detection unit 26 detects a switching device voltage between a collector and an emitter when the switching device is an IGBT and a transistor, a switching device voltage between a drain and a source when the switching device is an FET, and a switching device voltage between an anode and a cathode when the switching device is a thyristor and a GTO.

In FIG. 11, in order to simplify the drawing, only a mechanism for detecting a switching device voltage of the lower arm $U_L$ of the U phase, and mechanisms for detecting a switching device voltage of the lower arm $V_L$ of the V phase and the lower arm $W_L$ of the W phase are omitted. Note that, in order to reduce cost, a switching device serving as a detection target of a switching device voltage may be any one or two of the switching devices of the lower arms $U_L$, $V_L$, and $W_L$. For example, when the switching device voltage detection unit 26 detects all switching device voltages of the lower arms $U_L$, $V_L$, and $W_L$, the switching device voltage detection unit 26 detects, as a "switching device voltage", an average value of the three switching device voltages for the lower arms $U_L$, $V_L$, and $W_L$ or a maximum value among values of the three switching device voltages for the lower arms $U_L$, $V_L$, and $U_L$. For example, when the switching device voltage detection unit 26 detects two switching device voltages of the lower arms $U_L$, $V_L$, and $W_L$, the switching device voltage detection unit 26 detects, as a "switching device voltage", an average value of the two switching device voltages for the lower arms $U_L$, $V_L$, and $W_L$ or a maximum value among values of the two switching device voltages for the lower arms $U_L$, $V_L$, and $W_L$. For example, when the switching device voltage detection unit 26 detects one switching device voltage of the lower arms $U_L$, $V_L$, and $W_L$, the switching device voltage detection unit 26 detects a value of the one switching device voltage as a "switching device voltage".

The switching device voltage determination unit 27 determines whether or not the switching device voltage detected by the switching device voltage detection unit 26 exceeds a switching device voltage threshold value $V_{th2}$. The switching device voltage threshold value $V_{th2}$ may be set to a value lower than an allowable voltage in the conduction direction of the switching devices by approximately a few percent to a dozen percent, for example, in consideration of safety. The numerical example indicated herein is merely one example, and another value may be set. As the allowable voltage of the switching devices, for example, a value defined as one piece of specification data in a specification table, an instruction manual, or the like of the switching devices may be used. Note that the switching device voltage threshold value $V_{th2}$ may be stored in a rewritable storage unit (not illustrated) and be rewritable by external equipment, and can be changed to an appropriate value as necessary even after the switching device voltage threshold value $V_{th2}$ is set once. A determination result by the switching device voltage determination unit 27 is transmitted to the switching control unit 16.

When the motor control apparatus 1 operates under a normal state, when the DC link voltage determination unit 14 does not determine that the DC link voltage exceeds the voltage threshold value $V_{th1}$ even though the alarm signal is output from the alarm signal output unit 15, and when the switching device voltage determination unit 27 does not determine that the switching device voltage exceeds the switching device voltage threshold value $V_{th2}$ even though the alarm signal is output from the alarm signal output unit 15 and the DC link voltage determination unit 14 determines that the DC link voltage exceeds the voltage threshold value $V_{th1}$, the switching switch 42 does not connect the resistor 41 to each of the lower arms $U_L$, $V_L$, and $W_L$. Thus, a current does not flow through the resistor 41.

In a case where the alarm signal is output from the alarm signal output unit 15 and the DC link voltage determination unit 14 determines that the DC link voltage exceeds the voltage threshold value $V_{th1}$, when the switching device voltage determination unit 27 determines that the switching device voltage exceeds the switching device voltage threshold value $V_{th2}$, the switching switch 42 electrically connects the resistor 41 to each of the lower arms $U_L$, $V_L$, and $W_L$. Thus, a current flows through the resistor 41. Subsequently, the switching control unit 16 performs control in such a way as to turn on all of the switching devices of the lower arms $U_L$, $V_L$, and $W_L$. At this time, any of ON control and OFF control may be performed on the switching devices of the upper arms $U_U$, $V_U$, and $W_U$. According to the fifth embodiment, when a switching device voltage of the lower arms $U_L$, $V_L$, and $W_L$ exceeds the switching device voltage threshold value $V_{th2}$ set to a value lower than the allowable voltage, the resistor 41 is electrically connected to the lower arms $U_L$, $V_L$, and $W_L$. In this way, most of the energy on the basis of the counter electromotive force is consumed by the resistor 41 and the motor windings having the phases in the short-circuit state, and thus an overvoltage applied to the switching devices of the lower arms $U_L$, $V_L$, and $W_L$ can be avoided. In this way, also in the fifth embodiment, breakage of the DC link capacitor 4 and the switching devices of the lower arms $U_L$, $V_L$, and $W_L$ can be avoided.

In the fifth embodiment, the operation of the circuit components except for the switching device voltage detection unit 26, the switching device voltage determination unit 27, and the switching device protection circuit 21 is similar to the operation of the circuit components illustrated in FIG. 5.

FIG. 12 is a flowchart illustrating an operation flow of the motor control apparatus according to the fifth embodiment of the present disclosure.

Each processing in steps S501 to S503 is similar to each processing in steps S101 to S103 described with reference to FIG. 4.

In step S504, the DC link voltage determination unit 14 determines whether the DC link voltage exceeds the voltage threshold value $V_{th1}$. A determination result by the DC link voltage determination unit 14 is transmitted to the switching control unit 16. In step S504, when it is determined that the DC link voltage exceeds the threshold value $V_{th1}$, the processing proceeds to step S505, and, when it is not determined that the DC link voltage exceeds the threshold value $V_{th1}$, the processing ends.

In step S505, the switching device voltage detection unit 26 detects a switching device voltage being a potential difference in the conduction direction of the switching devices of the lower arms $U_L$, $V_L$, and $W_L$. A value of the switching device voltage detected by the switching device voltage detection unit 26 is transmitted to the switching control unit 16.

In step S506, the switching device voltage determination unit 27 determines whether the switching device voltage detected by the switching device voltage detection unit 26 exceeds the switching device voltage threshold value $V_{th2}$. A determination result by the switching device voltage determination unit 27 is transmitted to the switching control unit 16. In step S506, when it is determined that the switching device voltage exceeds the switching device voltage threshold value $V_{th2}$, the processing proceeds to step S507, and, when it is not determined that the switching device voltage exceeds the switching device voltage threshold value $V_{th2}$, the processing proceeds to step S508.

In step S507, the switching switch 42 electrically connects the resistor 41 to each of the lower arms $U_L$, $V_L$, and $U_L$. Thus, a current flows through the resistor 41. Subsequently, the processing proceeds to step S508.

In step S508, the switching control unit 16 performs control in such a way as to turn on all of the switching devices of the lower arms $U_L$, $V_L$, and $U_L$. At this time, any of ON control and OFF control may be performed on the switching devices of the upper arms $U_U$, $V_U$, and $W_U$. Further, although not illustrated in FIG. 12, processing in which the recording unit 18, the display unit 19, and the external device control unit 20 record or display the operation of "turning on all of the switching devices of the lower arms $U_L$, $V_L$, and $W_L$" being performed is executed. Subsequently, the processing ends.

Note that the third to fifth embodiments described above may be appropriately combined and performed.

The DC link voltage determination unit 14, the alarm signal output unit 15, the switching control unit 16, the recording unit 18, the display unit 19, the external device control unit 20, the temperature detection unit 22, the temperature determination unit 23, the current determination unit 25, and the switching device voltage determination unit 27 may be constituted in a software program form, for example, or may be constituted by a combination of various electronic circuits and a software program, or may be formed of only various electronic circuits. For example, when they are constituted in a software program form, an arithmetic processing device such as a DSP and an FPGA, for example, is operated in accordance with the software program, and thus the function of each unit described above can be achieved. Alternatively, the DC link voltage determination unit 14, the alarm signal output unit 15, the switching control unit 16, the recording unit 18, the display unit 19, the external device control unit 20, the temperature detection unit 22, the temperature determination unit 23, the current determination unit 25, and the switching device voltage determination unit 27 may be achieved as a semiconductor integrated circuit to which a software program that achieves the function of each unit is written. Alternatively, the DC link voltage determination unit 14, the alarm signal output unit 15, the switching control unit 16, the recording unit 18, the display unit 19, the external device control unit 20, the temperature detection unit 22, the temperature determination unit 23, the current determination unit 25, and the switching device voltage determination unit 27 may be achieved as a recording medium to which a software program that achieves the function of each unit is written. Further, the DC link voltage determination unit. 14, the alarm signal output unit 15, the switching control unit 16, the recording unit 18, the display unit 19, the external device control unit 20, the temperature detection unit 22, the temperature determination unit 23, the current determination unit 25, and the switching device voltage determination unit 27 may be provided in a numerical control apparatus of a machine tool, for example, and may be provided in a robot controller that controls a robot.

Further, the DC link voltage detection unit 13, the current detection unit 24, and the switching device voltage detection unit 26 may be formed of a combination of an analog circuit and a digital circuit, or may be achieved by an arithmetic processing device constituted in a software program form, or may be formed of only an analog circuit. Note that, for the DC link voltage detection unit 13, a component generally provided in the motor control apparatus 1 may be used.

Further, the storage unit that stores the voltage threshold value $V_{th1}$, the temperature threshold value $T_{th}$, the current threshold value $I_{th}$, and the switching device voltage threshold value $V_{th2}$ may be formed of a non-volatile memory being electrically deletable and recordable such as, for example, an EEPROM (registered trademark), a random access memory that can perform reading and writing at a high speed such as, for example, a DRAM and an SRAM, or the like.

According to one aspect of the present disclosure, in a motor control apparatus in which a converter and an inverter are connected to each other via a DC link, a significant increase in a DC link voltage due to an abnormal occurrence can be reliably prevented.

The invention claimed is:

1. A motor control apparatus, comprising:
   a converter configured to convert alternating current power input from an alternating current input side into direct current power, and output the direct current power to a DC link on a direct current output side;
   an inverter that is provided with, in each of an upper arm on a high potential side and a lower arm on a low potential side, a switching device connected in reverse parallel to a diode, and configured to convert the direct current power in the DC link into alternating current power for driving a motor by the switching device provided in the upper arm and the lower arm being subjected to ON/OFF control and output the alternating current power;
   a DC link voltage detection unit configured to detect a DC link voltage being a voltage between terminals of the DC link;
   a DC link voltage determination unit configured to determine whether the DC link voltage exceeds a voltage threshold value;
   an alarm signal output unit configured to output an alarm signal in an abnormal condition; and
   a switching control unit configured to perform ON/OFF control on the switching device, wherein,
   when the alarm signal is output from the alarm signal output unit and the DC link voltage determination unit determines that the DC link voltage exceeds the voltage threshold value, the switching control unit performs control in such a way as to turn on all the switching device of the lower arm.

2. The motor control apparatus according to claim 1, further comprising
   a counter electromotive force protection circuit that is provided between an alternating current output side of the inverter and the motor, the counter electromotive force protection circuit including a rectifier unit configured to rectify alternating current power based on counter electromotive force of the motor and output direct current power, and a short-circuit unit configured to short-circuit terminals on a direct current output side of the rectifier unit when the alarm signal is output from the alarm signal output unit.

3. The motor control apparatus according to claim 1, further comprising
a recording unit configured to record all the switching device of the lower arm being turned on when the alarm signal is output from the alarm signal output unit and the DC link voltage determination unit determines that the DC link voltage exceeds the voltage threshold value.

4. The motor control apparatus according to claim 1, further comprising
a display unit configured to display all the switching device of the lower arm being turned on when the alarm signal is output from the alarm signal output unit and the DC link voltage determination unit determines that the DC link voltage exceeds the voltage threshold value.

5. The motor control apparatus according to claim 1, further comprising
an external device control unit configured to perform control in such a way as to cause an external device to record or display all the switching device of the lower arm being turned on when the alarm signal is output from the alarm signal output unit and the DC link voltage determination unit determines that the DC link voltage exceeds the voltage threshold value.

6. The motor control apparatus according to claim 1, further comprising
a switching device protection circuit connected in series to a group of the diode and the switching device in the lower arm, the switching device protection circuit including a resistor, and a switching switch configured to selectively switch between electrical connection and electrical disconnection between the resistor and the lower arm.

7. The motor control apparatus according to claim 6, wherein,
when the alarm signal is output from the alarm signal output unit and the DC link voltage determination unit determines that the DC link voltage exceeds the voltage threshold value, the switching switch electrically connects the resistor to the lower arm.

8. The motor control apparatus according to claim 7, wherein,
when the alarm signal is output from the alarm signal output unit and the DC link voltage determination unit determines that the DC link voltage exceeds the voltage threshold value, the switching control unit performs control in such a way as to turn on all the switching device of the lower arm after the switching switch electrically connects the resistor to the lower arm.

9. The motor control apparatus according to claim 6, further comprising:
a temperature detection unit configured to detect a temperature of the switching device; and
a temperature determination unit configured to determine whether a temperature of the switching device exceeds a temperature threshold value, wherein,
in a case where the alarm signal is output from the alarm signal output unit and the DC link voltage determination unit determines that the DC link voltage exceeds the voltage threshold value, when the temperature determination unit determines that a temperature of the switching device exceeds the temperature threshold value, the switching switch electrically connects the resistor to the lower arm.

10. The motor control apparatus according to claim 6, further comprising:
a current detection unit configured to detect a current flowing through the switching device; and
a current determination unit configured to determine whether the current detected by the current detection unit exceeds a current threshold value, wherein,
in a case where the alarm signal is output from the alarm signal output unit and the DC link voltage determination unit determines that the DC link voltage exceeds the voltage threshold value, when the current determination unit determines that the current exceeds the current threshold value, the switching switch electrically connects the resistor to the lower arm.

11. The motor control apparatus according to claim 6, further comprising:
a switching device voltage detection unit configured to detect a switching device voltage being a potential difference in a conduction direction of the switching device; and
a switching device voltage determination unit configured to determine whether the switching device voltage detected by the switching device voltage detection unit exceeds a switching device voltage threshold value, wherein,
in a case where the alarm signal is output from the alarm signal output unit and the DC link voltage determination unit determines that the DC link voltage exceeds the voltage threshold value, when the switching device voltage determination unit determines that the switching device voltage exceeds the switching device voltage threshold value, the switching switch electrically connects the resistor to the lower arm.

* * * * *